United States Patent
Kuhmann et al.

(10) Patent No.: US 12,059,876 B2
(45) Date of Patent: **\*Aug. 13, 2024**

(54) WEB, SANDWICH PLATE, SANDWICH BLOCK AND METHODS FOR PRODUCING SAME

(71) Applicant: AIR BAMBOO INDUSTRIAL GMBH, Eberswalde (DE)

(72) Inventors: Jochen Kuhmann, Berlin (DE); Matthias Albrecht, Berlin (DE); Roman Kujus-Tenekedshijew, Federow (DE)

(\*) Notice: Subject to any disclaimer, the term of this patent is extended or adjusted under 35 U.S.C. 154(b) by 313 days.

This patent is subject to a terminal disclaimer.

(21) Appl. No.: 15/749,786

(22) PCT Filed: Jul. 29, 2016

(86) PCT No.: PCT/EP2016/068258
§ 371 (c)(1),
(2) Date: Feb. 2, 2018

(87) PCT Pub. No.: WO2017/021344
PCT Pub. Date: Feb. 9, 2017

(65) Prior Publication Data
US 2019/0001609 A1    Jan. 3, 2019

(30) Foreign Application Priority Data

May 12, 2016   (DE) .......................... 102016108854.4

(51) Int. Cl.
*B32B 3/20*         (2006.01)
*B32B 3/18*         (2006.01)
(Continued)

(52) U.S. Cl.
CPC .................. *B32B 3/20* (2013.01); *B32B 3/18* (2013.01); *B32B 37/18* (2013.01);
(Continued)

(58) Field of Classification Search
CPC ....... B32B 3/20; B32B 37/18; B32B 2419/00; B32B 3/18; B32B 38/0004; E04C 2/10; E04C 2/34; E04C 2002/3477
See application file for complete search history.

(56) References Cited

U.S. PATENT DOCUMENTS

| | | | |
|---|---|---|---|
| 3,078,521 A | | 2/1963 | Laurendeau |
| 4,428,993 A | \* | 1/1984 | Kohn ........................ B32B 3/12 428/117 |

(Continued)

FOREIGN PATENT DOCUMENTS

| | | |
|---|---|---|
| CN | 1454277 | 11/2003 |
| DE | 2423384 | 5/1974 |

(Continued)

*Primary Examiner* — Alicia J Weydemeyer
*Assistant Examiner* — Laura B Figg
(74) *Attorney, Agent, or Firm* — JMB Davis Ben-David

(57) ABSTRACT

The invention relates to a web (1) with a web base (3) and a tube segment (4) made of a wood-based material or bamboo, wherein the tube segment (4) comprises a wall (5) which is delimited in the circumferential direction of two cut ends (8, 9), and wherein the tube segment (4) is mechanically connected to the web base (3) by means of at least one of the cut ends (8, 9).

Figure 1:
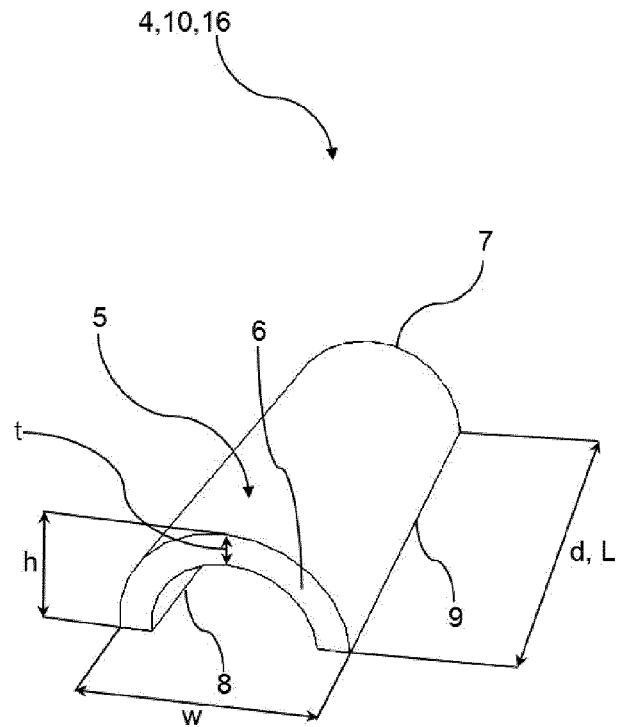

The invention further relates to a sandwich plate (2) with a plate layer (11) and a core layer (13), wherein the core layer (13) comprises at least one web (1) according to the invention which is mechanically connected to the adjacent connecting face (14) of the plate layer (11) by means of a cut face (6, 7) of a tube segment (4), wherein the cut faces (6, 7) delimit the wall (5) of the tube segment (4) in longitudinal extension direction.

The invention further relates to a sandwich block (26) and a methods for producing a sandwich plate, a web (1) and a sandwich block (26).

4 Claims, 13 Drawing Sheets

(51) Int. Cl.
 *B32B 37/18* (2006.01)
 *B32B 38/00* (2006.01)
 *E04C 2/10* (2006.01)
 *E04C 2/34* (2006.01)

(52) U.S. Cl.
 CPC ............ *B32B 38/0004* (2013.01); *E04C 2/10* (2013.01); *E04C 2/34* (2013.01); *B32B 2419/00* (2013.01); *E04C 2002/3477* (2013.01)

(56) References Cited

U.S. PATENT DOCUMENTS

| | | | | |
|---|---|---|---|---|
| 4,647,063 | A | * | 3/1987 | Piringer ................. B32B 29/08 280/610 |
| 5,879,446 | A | * | 3/1999 | Patel ...................... E04C 2/043 106/781 |
| 5,948,198 | A | * | 9/1999 | Blyt ........................ B27D 1/08 156/206 |
| 2002/0043743 | A1 | | 4/2002 | Takayoshi |
| 2005/0229819 | A1 | * | 10/2005 | Hollander .......... B65D 19/0026 108/51.3 |
| 2009/0022959 | A1 | * | 1/2009 | Snel ....................... B32B 13/08 428/174 |
| 2019/0177037 | A1 | * | 6/2019 | Kuhmann ................ B32B 3/18 |
| 2019/0210316 | A1 | * | 7/2019 | Kuhmann ................ B32B 3/18 |
| 2019/0382159 | A1 | * | 12/2019 | Kuhmann .......... B65D 19/0075 |

FOREIGN PATENT DOCUMENTS

| | | | |
|---|---|---|---|
| DE | 2505232 | | 8/1975 |
| DE | 2650353 | | 5/1977 |
| DE | 19914451 | | 10/2000 |
| DE | 102009005102 | | 7/2010 |
| GB | 2234935 | | 7/1990 |
| JP | 2013189755 | | 9/2013 |
| RU | 103548 | | 4/2011 |
| WO | 03/059612 | | 7/2003 |
| WO | WO 03/059612 | * | 7/2003 |
| WO | 2012076455 | | 6/2012 |
| WO | 2013162405 | | 10/2013 |
| WO | 2013162406 | | 10/2013 |

* cited by examiner

WEB, SANDWICH PLATE, SANDWICH BLOCK AND METHODS FOR PRODUCING SAME

CROSS-REFERENCE TO RELATED APPLICATIONS

This is the U.S. National Stage of International Application No. PCT/EP2016/068258 filed on Jul. 29, 2016, which was published under PCT Article 21(2), and which in turn claims the benefit of German Patent Application Nos. 102015112797.0 filed Aug. 4, 2015 and 102016108854.4 filed May 12, 2016.

The present invention relates to a web for a sandwich plate, a sandwich plate and a sandwich block, in particular for shell construction, interior construction, as construction site plates or pallets, and methods for producing a web, a sandwich plate and a sandwich block.

The present invention relates in particular to the production of a plate made of sustainable materials, which is at the same time so cost-efficient producible that it can compete with established and less sustainable products. In general, wood-based materials or the fast-growing and cost-effective raw material bamboo are the ideal materials for this purpose.

Various plates and plate materials, in particular high-density fibreboard (HDF), are known from the prior art for shell construction and interior construction, as well as for many other applications.

The document CH 254025 A discloses a middle layer of folded veneer, wherein the folded veneer consists in particular of folded solid tubes. This has the disadvantage that the overlapping parts of the solid tubes create additional material costs and increase the weight of the components.

The document DE 670799 A discloses a building element with a middle layer of continuous, corrugated veneer. Furthermore, the document DE 10 2006 054 634 B4 reveals a building element with a middle layer of continuous angled veneer. A disadvantage of these designs is the complex production process of the respective middle layer.

In the patent application DE 10 2009 005 102 A1, a building element is described with a continuous middle layer of interconnected angle strips, which are each connected to the adjacent cover layer with only one cut end. A disadvantage of this continuous middle layer is its complex construction method and low options of variation in the corresponding production process.

Known are also sandwich plates with a bamboo core material and an outer formwork made of plates, such as shown in the documents DE 42 38 562 A1, DE 20 2008 002 337 U1 and U.S. Pat. No. 5,738,924 A, where straight or corrugated web elements or solid rings are used as core material.

Document GB 2 234 935 A discloses a building element with layers of longitudinal bamboo tube sections, each with 4 cut ends, which are each mechanically connected to an adjacent plate. The longitudinal bamboo tube sections have a wall that is open at two points. This has the disadvantage that the cross-connections, which are present in the bamboo tubes, between the two halves of the longitudinal bamboo tube sections are essential to form a coherent stabilizing structure of the core layer of the building element. Furthermore, the longitudinal bamboo tube sections are characterized by an elaborate production process.

In the documents WO 2013 162405 A1 and WO 2013 162406 A1, a composite layer structure is composed of two surface layers of a support material and an interposed inner layer of a reinforced honeycomb cell structure, which is in particular formed from plates or chips made of bamboo cut along the grain direction, wherein the longitudinal extension of the plates or chips in grain direction is substantially smaller than the width and depth of the surface layers. Such a core layer is laboriously to produce, because on the one hand cutting the plates or chips from bamboo tubes is complex, and on the other hand a plurality of plates or chips have to be arranged on the carrier material and connected to the carrier material.

The use of solid bamboo rings expoits the fundamental advantage that the intermediate processing step of the bamboo raw material into plate material, usually as plywood, is saved and at the same time, the excellent natural mechanical properties of bamboo raw material can be used. Especially as bamboo as a natural product has very different diameters, in particular within one stem, a sandwich plate produced in such way cannot currently be placed on the market at accepted prices.

Furthermore, processes for the production of wooden elements, such as wood briquettes, from a wood mass (called dendromass) comprising wood fibres or wood shavings are known. For example, the document DE 10 2012 021 612 A1 discloses a process for the production of wood briquettes by means of an extruder.

On this basis, the object of the present invention is to provide a web, a sandwich plate and a sandwich block which are characterized by high mechanical stability, sustainability and cost-effective producibility. An embodiment of the sandwich plate according to the invention is described in the claims. Embodiments of the web according to the invention are further described in the claims. Embodiments of the sandwich block according to the invention are also described in the claims. The features of the claims can be combined in any technically meaningful way, wherein the explanations from the following description as well as features from the figures comprising additional embodiments of the invention can also be consulted for this purpose.

According to a first aspect of the invention, a web is provided, in particular for a sandwich plate according to the fourth aspect of the invention, wherein the web comprises at least the following components: a web base and at least one tube segment, each comprising a wall which is delimited in the circumferential direction of the respective tube segment by at least two, in particular exactly two, cut ends, wherein the wall is delimited in the longitudinal extension direction of the tube segment by two cut faces, and wherein the at least one tube segment each has a segment height which represents the maximum extension of the respective tube segment perpendicular to the web base, and wherein the at least one tube segment has a segment depth extending in the longitudinal extension direction, and wherein the web has a web depth extending in the longitudinal extension direction of the at least one tube segment.

Thereby, the at least one tube segment is each mechanically connected to the web base by means of the at least two cut ends, wherein the web depth is equal to the segment depth of the at least one tube segment.

According to one embodiment, the web comprises a web base and at least one tube segment, in particular several tube segments. Thereby, the at least one tube segment each comprises a wall which is delimited in the circumferential direction of the respective tube segment by two cut ends, wherein the at least one tube segment is mechanically connected to the web base by means of at least one of the cut ends, in particular by means of both cut ends. The wall of the at least one tube segment is delimited by two cut faces in the longitudinal direction of the respective tube segment. The at least one tube segment consists of a wood-based material or comprises a wood-based material.

The at least one tube segment has a segment depth extending in the longitudinal extension direction and a segment height which represents the maximum extension of the respective tube segment perpendicular to the web base of the web. Furthermore, the tube segment has a segment width perpendicular to the segment height and perpendicular to the segment depth, i.e. in the third spatial direction.

In the context of the present invention, the term tube segment refers to a part of a real or imagined tube with a longitudinal extension direction. The cross-section of the tube perpendicular to its longitudinal extension direction has a circumference, i.e. an imaginary line which delimits the cross-section on its outer side. Thereby, the cross-section is not necessarily circular, but can inparticular also be formed angular or elliptical. The circumferential direction of the tube (even in the case of a tube with an angular cross-section) runs along an imaginary circle that surrounds the cross-section of the tube perpendicular to the longitudinal direction of extension.

The tube segment is characterized by an opening arranged in the circumferential direction of its wall. The opening is continuous in longitudinal extension direction. Thereby, the circumferential direction of the tube segment refers to the circumferential direction of the associated real or imagined tube, which has a closed wall. The tube segment can be formed in particular by cutting the tube, but can also be formed in other ways, in particular by mechanical connecting of several strips or by an extruder process.

The cut ends of the tube segment delimit the tube segment in circumferential direction. The opening of the tube segment in circumferential direction is therefore delimited by the cut ends. Said opening means that the cross-section of the tube segment is formed by an open profile. In particular, the open profile can be shaped circularly segmented, e.g. semicircularly, U-shaped or V-shaped.

In the context of the present invention, the term longitudinal extension direction of the tube segment refers to the longitudinal extension direction of the associated (real or imagined) tube.

If the tube segment is placed on a flat surface by the cut ends, the maximum segment height is the distance between this flat surface and the highest point of the tube segment. The segment width is the distance of the maximum extension parallel to this flat surface perpendicular to the segment height and segment depth.

In the direction of its longitudinal extension, i.e. along its segment depth, the tube segment is limited by two cut faces. Thereby, the cut faces are in particular arranged perpendicular to the longitudinal extension direction. The cut faces can also be inclined to the longitudinal extension direction.

The tube segments of a web according to the invention can be produced in particular by slicing a half-tube transversely to the longitudinal extension of the half-tube, e.g. by means of a cut-off saw (also known as a multirip saw). In this case, the cut faces of the generated tube segment are formed at the dissection sites. A respective half-tube can in turn be produced by splitting a tube parallel to the longitudinal extension of the tube, wherein the cut ends are formed at the splitting sites. Alternatively, the tube segments of a web can also be formed from strips, e.g. by gluing the strips. Thereby, the strips extend in the direction of the longitudinal extension direction of the tube segment. In this embodiment, in particular a tube segment with an angular cross-section is formed.

According to one embodiment, the web comprises a plurality of tube segments, wherein the tube segments are arranged in parallel relative to their longitudinal extension direction. The web has a web depth which extends in the common longitudinal extension direction of its tube segments. In particular, the tube segments of the web have the same segment depth and the web depth is equal to the common segment depth of the tube segments. Hereby, the web has a web width in the direction of the segment width of the tube segments. The web base of the web has a base height in the direction of the segment height of its tube segments.

According to a first subaspect of the web according to the invention, the at least one tube segment of the web consists of a wood-based material or comprises a wood-based material.

According to one embodiment of the web, the web base consists of a wood-based material or comprises a wood-based material.

A web according to the invention is characterized in particular by a high mechanical load-bearing capacity in the longitudinal extension direction of its tubular segments and is therefore well suited for the construction of structures for the shell and/or interior construction, in particular of sandwich plates and sandwich blocks according to the invention.

In the context of the present invention, the term wood-based material refers to a material which comprises shredded wood, in particular wood shavings, wood chips, wood veneers, wood veneer strips, wood wool, wood fibres or wood dust, or other lignocellulosic materials. Furthermore, the wood-based material may comprise in particular binders, adhesives and/or additives. In particular, additives may be hydrophobising agents, wood preservatives, flame retardants, hardeners or paint particles. Binders include in particular urea glue, synthetic resins, e.g. phenolic resins, isocyanates, plastics and/or bioplastics. Wood veneers and/or strips of wood veneer are used in particular for the production of plywood and/or flakeboard (OSB boards).

Wood-based materials include in particular solid wood materials, e.g. solid wood plates (in accordance with DIN EN 12775) or laminated wood plates, cross laminated timber, glued laminated timber, blockplywood and/or laminated wood, veneer-based materials, e.g. veneer plywood (FU), veneer laminated wood, veneer strip wood, bending plywood, wood chipboard materials, e.g. flat pressed boards (P2), extruded panels, chipboard mouldings, flakeboard (OSB boards, according to DIN EN 300) and/or laminated strand lumber (LSL), wood fibre materials, e.g. wood fibre insulation boards (HFD), porous fibre boards, soft boards (SB), medium-hard fibre boards (MB), hard fibre boards (HB or HFH), hard fibre boards, extra-hard fibre boards (HFE), medium-density fibre boards (MDF), high-density fibre boards (HDF) and/or ultra-lightweight fibre boards (ULDF), arboform or liquid wood.

The term fibreboard refers to the wood-based materials specified in DIN EN 622. The term chipboard refers to the wood-based materials specified in the standards DIN EN 309 and DIN EN 312. The term plywood refers to the wood-based materials specified in the standards DIN 68708 and DIN EN 313.

Wood-based materials as basic materials for shell and interior construction have the advantage of high material strength and mechanical load-bearing capacity combined with lightness.

According to a further embodiment, the wood-based material comprises a lignin content of >5%, in particular >10% by weight. This means that in particular paper and cardboard do not represent wood-based materials in the sense of this invention, as the lignin of the wood-based raw materials used is largely removed during paper production, e.g. by chemical bleaching agents.

According to a further embodiment, the wood-based material is free of chemical bleaching agents.

According to a further embodiment, the wood-based material is produced in a drying process at a wood moisture content of <20%. The indicated proportion refers to the ratio of the weight of water to the absolutely dry wood mass. In a drying process, the wood particles are dried to form a product before fleece generation and pressing, and the product has a moisture content of less than 20%. Glue can be applied before or after drying.

According to a further embodiment, the wood-based material comprises wood fibres pressed under pressure and/or heat. According to a further embodiment, the wood-based material has a density of >800 kg/m$^3$. High-density fibreboards, for example, have a density in said range.

According to a further embodiment, the tube segment is made of a material of a high-density fibreboard (HDF). High-density fibreboards (HDF) have a particularly high strength.

According to a further embodiment, the tube segment is formed of a plurality of strips. The strips extend in the longitudinal extension direction of the pipe segment. In this embodiment, in particular a tube segment with an angular cross-section is formed.

According to a further embodiment, at least one tube segment of the web is made of pressed wood, in particular pressed wood fibres or wood shavings. For example, the tube segment can be produced by splitting a tube made of pressed wood. The production of such a tube may be produced, for example, by pressing a wood mass comprising shredded wood, in particular wood fibres or wood shavings, into a press mould channel with a tubular recess and hardening of the wood mass. Alternatively, a half-tube or tube segment can also be produced directly by pressing a wood mass, in particular in a press mould channel with a tubular segment shaped recess or by means of a flattening tool with a suitable contour.

According to a further embodiment, the wood-based material is produced from a wood mass, in particular dendromass, by means of an extruder process.

The use of pressed wood allows a cost-efficient production of tubes or tube segments of almost any shape and dimension, wherein a very uniform sizing of tubes or tube segments can be achieved in comparison to natural products.

According to one embodiment, the web comprises a web base and a plurality of tube segments, wherein each tube segment of the plurality of tube segments has a wall which is delimited in the circumferential direction of the respective tube segment by two cut ends, and wherein each tube segment of the plurality of tube segments is each mechanically connected to the web base by means of both cut ends, and wherein each tube segment of the plurality of tube segments consists of a wood-based material or comprises a wood-based material.

According to one embodiment, the web comprises at least two tube segments, wherein the at least two tube segments have the same segment height. Thereby, the segment height represents the maximum extension of the tube segment perpendicular to the longitudinal extension direction of the tube segment and perpendicular to the circumferential direction of the tube segment.

According to a further embodiment, the web comprises a plurality of tube segments, wherein all tube segments of the plurality of tube segments have the same segment height.

Due to such a uniform segment height, webs according to the invention can be arranged or stacked in parallel without creating unnecessary cavities. Thus, stable larger structures, e.g. core layers for a sandwich plate according to this invention, can be produced easily from such webs without the need of filling cavities for example with a filler.

In addition, the advantage is that several plies or layers of webs according to the invention can be arranged more regularly due to their uniform segment height, which is particularly advantageous for the production of a sandwich block according to the invention and a sandwich plate according to the invention.

According to a further embodiment, the wall of the at least one tube segment comprises a flattening. Such a flattening may be determined by the shape of the wall of the tube segment, for example in the case of an angular, particularly U-shaped, trapezoidal-segmental-shaped or octagonal-segmental-shaped cross-section. In this case, the flattening is formed by a surface which is delimited on both sides, i.e. on both cut faces by an edge of the angular cross-sectional shape. The corresponding edge is arranged in the area of the maximum segment height.

According to a further embodiment, the wall of the tube segment has an angular cross-section, in particular a U-shaped, trapezoidal-segmental-shaped or octagonal-segmental-shaped cross section.

According to a further embodiment, the wall of the tube segment has a U-shaped cross-section.

According to a further embodiment, the wall of the tube segment has a trapezoidal-segmental-shaped cross-section.

According to another design, the wall of the tube segment has an octagonal-segmental-shaped cross-section.

Tubes with an angular cross-section of the wall are producible cost-effectively, in particular by producing strips by milling out mitres from a board and assembling the strips. In particular, boards pressed of wood mass can be used for this purpose. Such boards can be in particular high-density fibreboards (HDF). In particular, the mitres are carried out in such a way that the strips produced by means of the mitres are not completely separated from each other. An advantage of this embodiment is the easier assembly of the tube from the strips. In addition, the mitres form recesses to hold glue, which makes it easier to assemble the tube from the strips.

According to a embodiment of the web, both cut ends of the at least one tube segment are formed by a common secant cut through a tube. As a result, the two cut ends are already formed in one plane and parallel to each other by means of this single cut. In particular, a tube is split into two halves, i.e. the cut is guided diametrically through the tube material.

According to a further embodiment, both cut ends of the at least one tube segment are each formed by a radial cut through a tube. Thereby, more than two segmental bars can be produced from one tube. If more than two segmental bars are produced from one tube, the cut ends of at least two of the segmental bars formed are not aligned parallel but at an angle to each other. The resulting groove-shaped gap between at least one cut end and the web base can for example be filled with a volume of glue. Alternatively, the cut ends are refinished by levelling, such as planing, in such a way that the cut ends can be placed on a joint face in parallel.

According to a further embodiment, the web comprises at least two tube segments, wherein at least one cut end of the at least two tube segments is each mechanically connected to a first face of the web base. In particular, both cut ends are each mechanically connected to the first face of the web base. In this embodiment, the tube segments of the web are arranged on one side of the web base, in particular next to each other. Hereby, a positive connection of the web for example with a plate or another web by means of the web base can be formed on the side of the web base, which has no tube segments. In particular, the at least two tube segments have the same segment height perpendicular to the first face.

According to a further embodiment, the web comprises at least one first tube segment and at least one second tube segment, wherein at least one cut end, in particular both cut ends, of the at least one first tube segment is each connected to a first face of the web base, and wherein at least one cut end, in particular both cut ends, of the at least one second tube segment is each connected to a second face of the web base opposite the first surface. Hereby, the web comprises in particular a plurality of first tube segments and a plurality of second tube segments, wherein the first tube segments and the second tube segments are arranged alternately at the web base along a web width. In this embodiment, the tube segments of the web are arranged on both sides of the web base, in particular next to each other. In particular, the tube segments can be staggered relative to each other, for example offset by a segment width, so that a corrugated profile results in particular in the cross-section of the tube segments. The tube segments connected to the same face of the web base each have a distance to the adjacent tube segments.

According to a further embodiment, the web comprises a plurality of first tube segments and a plurality of second tube segments, wherein the first tube segments are each connected to a first face of the web base by means of at least one cut end, in particular both cut ends, and wherein the second tube segments are each connected by means of a second face opposite to the first face, and wherein the first tube segments and the second tube segments each form a continuous row. In this embodiment, there is thus essentially no gap between adjacent first tube segments and adjacent second tube segments.

According to a further embodiment of the web, the ratio of the base height to the web depth is between 1:1 and 1:20, in particular between 2:3 and 1:10.

In one embodiment of the core layer, the web depth is between 1 mm and 150 mm, in particular between 3 mm and 120 mm, more particularly between 7 mm and 100 mm.

According to a further embodiment of the web, the wall of the at least one tube segment is curved.

According to a further embodiment of the web, the wall of the tube segment has a circular segmental cross-section. Such tube segments can be easily produced in particular by splitting a suitable tube.

According to a further embodiment, the web comprises a plurality of tube segments arranged parallel to its longitudinal extension direction with a segment width extending perpendicular to the segment height and the longitudinal extension direction, wherein adjacent tube segments perpendicular to the common longitudinal extension direction have a distance, and wherein the distance corresponds to one to two times the segment width, in particular exactly the segment width.

In particular, a web is produced by connecting, in particular gluing, a segmental bar to the cut ends on a base plate as an intermediate product, wherein the webs are subsequently produced by slicing this intermediate product transversely to the longitudinal extension (segment depth) of the segmental bar, for example by means of a cut-off saw. Thereby, the web base and the tube segment are formed automatically with exactly the same depth.

According to a second subaspect, the at least one tube segment of the web according to the invention forms a curved wall, wherein the curved wall has a maximum segment height (h) in the direction of the curvature, a segment width (w) transverse to the direction of the curvature and a segment depth (d) in the direction of a tube extension, wherein the segment depth (d) is delimited by two cut faces and the curved wall is delimited by at least two, in particular exactly two, cut faces, wherein the at least one tube segment is connected to the web base by means of the at least two cut ends.

According to one embodiment, a web for a sandwich plate is provided which comprises at least the following components: a web base and at least one tube segment, wherein the tube segment forms a curved wall, and wherein the curved wall has a maximum segment height (h) in the direction the curvature, a segment width (w) transverse to the direction of the curvature and a segment depth (d) in the direction of tube extension, wherein the segment depth (d) is delimited by two cut faces and the curved wall is delimited by two cut faces, wherein the at least one tube segment is connected to the web base by means of at least one cut end. The web proposed here is in particular suitable as a core material for a sandwich plate. The web has a particularly high strength, in particular in the direction of the tube extension. It should be noted here that the tube segment can be produced particularly cost-effectively from a bar half-piece, e.g. from a tube or from a segmental bar, e.g. a half-tube, with a bar length extending transversely to the (hollow) wall, by slicing this bar half-piece into strips or slices by means of a cut-off saw (also known as multirip saw) transversely to the bar length. In particular, the tube segment is made directly from a bamboo tube, wherein the bamboo tube is split, in particular cleaved or sawed up, along the length (of the bar) into several, in particular two segments, and subsequently sliced, in particular sawed up, transversely to the length of the bamboo tube, i.e. transversely to the grain direction, into individual slices as described above. However, the invention is not limited to this production. For example, a tube segment may be produced from a plastic by injection moulding in the final shape. The tube segment may also display residual material from other manufacturing processes. Metals, wood-based materials, plastics, paper, cardboard or other materials may be used here, wherein in particular these materials are available in particular as, particularly hollow or curved, bar half-piece. Of note are the particularly sustainable use of mass-produced products, in particular (discarded) conduits, in particular made of plastic, and (discarded) bobbins, in particular industrial bobbins, for yarns (e.g. a cop), for continuous paper rolls or something similar, in particular made of cardboard.

The web base is formed from any material, and in particular sawn up of plate material, forming a single strip. In particular, the web depth (D), as far as the respective manufacturing process permits it, is of the same size, in particular exactly the same size, as a segment depth (d) of the corresponding tube segment. However, the invention is not limited to this production. For example, a web base may be produced from a cast material as plate material or in the final shape. The web base can also display residual material from other manufacturing processes. Metals, wood-based materials, plastics, paper, cardboard or other materials may be used here, wherein in particular these materials are available in particular as plate material or can be joined to plate material, in particular by means of gluing.

The tube segment has a curved wall. This means that the tube segment is not a flat material but has a radius, wherein the radius does not have to be constant. Hereby, the curvature can also be formed by a sharp kink, at least a corrugation or similar shapes. For example, a bar half-piece with an angular tube cross-section may be used for this purpose. As a result of the curvature, the tube segment has a maximum segment height (h) which is in particular at least twice as high as the thickness (t) of the wall. The tube segment comprises two cut ends. If the tube segment is placed with the cut ends on a flat surface, the maximum segment height (h) is the distance between this flat surface and the highest point of the tube segment or its curvature. The segment width (w) is the distance of the maximum extension parallel to this plane surface, i.e. perpendicular to the maximum segment height (h). The direction of the curvature is the direction of the segment height (h). The segment depth (d) represents the extension of the tube segment in the third spatial direction, so that for tube segment cut orthogonally to the length direction of a bamboo tube, the segment depth (d) is aligned parallel to the (main) grain direction of the bamboo tube. The segment depth (d) is aligned perpendicular to the cut faces and represents the distance between these cut faces. In the case of a tube as a bar half-piece, which is sliced into individual tube segments obliquely to the longitudinal extension, the segment depth is not parallel to the longitudinal extension, but perpendicular to the cutting plane. In one embodiment a tube segment is U-shaped, wherein the front side and rear side of the U-shaped form the cut faces and the two (upper) open ends of the U-shaped form the cut ends. This definition also applies to other forms of a tube segment.

In particular, a web is produced by connecting, e.g. gluing, a segmental bar to the cut ends on a base plate as an intermediate product, wherein the webs are then produced by slicing this intermediate product transversely to the longitudinal extension (bar length) of the segmental bar, for example by means of a cut-off saw. Hereby, the web base and the tube segment are automatically formed with exactly the same depth (D, d). A further advantage of this production process of the segmental bar from a tube material or half-tube material in is that the cut ends usually have a surface finish different from the outer faces (e.g. cylinder surfaces), which is more suitable for gluing. In particular with bamboo tubes or (plastic) conduit material, the outer faces (outside and/or inside) are particularly smooth and unsuitable for gluing. As a result of cutting or sawing, an uncoated surface is exposed at the cut ends and the surface is roughened, respectively. In this way, such a segmental bar can be placed fast and easily and glued cost-effectively. A polyurethane adhesive is particularly suitable for gluing the cut ends of a tube segment made of a bamboo tube.

According to a further embodiment of the web, the at least one tube segment is each a slice of a bamboo tube, wherein in particular the web base is formed of bamboo plywood.

A slice is a section formed by a cut that is guided transversely to the bar length, in particular by means of sawing, so that as a result, the cut faces are formed with the distance of the segment depth (d) and web depth (D), respectively, in particular without further processing steps. In principle, different materials can be combined with each other, provided that they can be joined (especially economically) with each other. In terms of at least sustainability, but also in terms of specific weight and cost, it is in particular advantageous to use bamboo material. A further advantage of using bamboo material for both the tube segment and the web base is the same or very similar adhesive properties, similar thermal expansion and similar behavior in case of moisture.

According to an advantageous embodiment of the web, both cut ends are formed by a common secant cut through a tube.

The advantage of this embodiment is that the two cut ends are already formed in one plane and parallel to each other by means of this single cut. Especially, in particular a tube is split into two halves, i.e. the cut is guided diametrically through the tube material. In the case of natural materials, such as bamboo, the longitudinal extension and diameter, as well as the position of the centre of the diameter over the length are not necessarily exactly the same. In particular, this secant cutting is performed according to the diameter and position of the centre when clamping the cutting, in particular sawing, machine. For some applications it may be advantageous to adjust a desired height of the tube segment by moving the secant cut parallel to the diameter, i.e. to the diametric secant.

According to an advantageous embodiment of the web, both cut ends are each formed by a radial cut through a tube.

The advantage of this embodiment is that herein more than two segmental bars can be produced from one tube. If more than two segmental bars are produced from one tube, the cut ends of at least two of the segmental bars formed are not aligned parallel but at an angle to each other. The resulting groove-shaped gap between at least one cut end and the web base can for example be filled with a volume of glue. Alternatively, the cut ends are refinished by levelling, such as planing, in such a way that the cut ends can be placed on a joint face in parallel.

According to an advantageous embodiment of the web, each tube segment of the web has the same width (w). According to an advantageous embodiment of the web, each tube segment of the web has the same segment height (h). In particular in the case of (discarded) mass-produced products as half products, these specifications make it easier to determine the strength of the web and sandwich plate, respectively, and, under certain circumstances, the manufacturing process.

According to a further embodiment of the web, the segment depth of the at least one tube segment is less than the segment width of the at least one tube segment, wherein in particular the ratio between the segment depth and the segment width of the at least one tube segment is less than 5 to 1, in particular less than 2 to 1.

According to a further embodiment of the web, the web depth is the same size as a segment depth of the corresponding tube segment.

According to a second aspect of the invention, a sandwich block comprising at least two web layers, each of which is formed from at least one web according to the first aspect of the invention, is provided. Thereby, the web layers are stacked in the direction of the segment height of their webs, wherein a block plate layer may optionally be arranged between two adjacent web layers and wherein in particular the tube segments of the webs are arranged parallel to each other in relation to their respective longitudinal extension direction.

According to one embodiment, the sandwich block comprises at least one first web layer, a second web layer and/or a block plate layer. Thus, the first web layer comprises at least one first web according to the first aspect of the invention and the second web layer comprises at least one second web according to the first aspect of the invention.

The block plate layer is formed from a plate with a first face of the plate. The sandwich block may therefore either comprise at least one first web layer and at least one second web layer or at least one first web layer and at least one block plate layer or at least one first web layer and at least one second web layer and at least one block plate layer.

According to one embodiment, the sandwich block comprises a plurality of web layers that are mechanically connected to each other directly without a block plate layer in between.

According to a further embodiment, each web layer is connected to an adjacent block plate layer, so that the sandwich block is formed of alternately stacked web layers and block plate layers.

According to one embodiment of the sandwich block, the at least one first web of the first web layer is mechanically connected to the web base of the adjacent second web layer by means of at least one wall, in particular by means of the respective flattening (if any) of the at least one wall, of the at least one of its tube segments.

According to one embodiment of the sandwich block, the at least one first web of the first web layer is mechanically connected to the first plate face of the adjacent block plate layer by means of at least one wall, in particular by means of the respective flattening (if any) of the at least one wall, of the at least one of its tube segments.

According to a further embodiment, the at least one first web of the first web layer is mechanically connected to a wall of the at least one tube segment of the adjacent second web layer by means of at least one wall, in particular by means of the respective flattening (if any) of the at least one wall, of at least one of its tube segments.

According to one embodiment of the sandwich block, the at least one first web of the first web layer is mechanically connected by means of its web base to the web base of the adjacent second web layer.

According to one embodiment of the sandwich block, the at least one first web of the first web layer is mechanically connected to the first face of the adjacent block plate layer by means of its web base.

According to one embodiment, the first web layer is formed from exactly one first web. According to a further embodiment, the second web layer is formed from exactly one second web. According to a further embodiment, the first web layer is formed from exactly one first web and the second web layer is formed from exactly one second web.

According to a further embodiment, the first web layer is formed from a plurality of first webs and/or the second web layer is formed from a plurality of second webs, wherein the first webs and the second webs are arranged parallel to each other in relation to their respective web base.

According to one embodiment of the sandwich block, the first web layer and the second web layer of the sandwich block are arranged in such a way that the tube segments of the first webs are arranged parallel to each other in relation to their longitudinal extension direction. In particular, the at least one block plate layer is arranged parallel to the common longitudinal extension direction of the tube segments.

According to a further embodiment, the sandwich block comprises a block plate layer that terminates the sandwich block on one side.

According to a further embodiment, each web layer of the sandwich block adjoins a block plate layer, in particular wherein the web layers and block plate layers are arranged alternately in layers.

According to a further embodiment, the at least one web of the sandwich block, in particular each web of the sandwich block, comprises at least two tube segments, wherein each tube segment of the at least two tube segments of the corresponding web are connected to a first face of the web base of the corresponding web. Thereby, the sandwich block comprises in particular a plurality of web layers that are mechanically connected to each other directly without a block plate layer in between.

According to a further embodiment, each web of the sandwich block comprises at least one first tube segment and one second tube segment, wherein the first tube segment is connected to a first face of the web base of the corresponding web, and wherein the second tube segment is connected to a second face of the web base of the corresponding web opposite the first face, wherein in particular the first tube segments and the second tube segments are arranged alternately at the web base of the corresponding web along a web width of the corresponding web base. In particular, each web layer is connected to an adjacent block plate layer, so that the sandwich block is formed from web layers, which are each arranged in stacked manner, and block plate layers.

According to a further embodiment, the sandwich block comprises at least one cover plate which is aligned parallel to the web layers and/or block plate layers and terminates the sandwich block on one side.

According to a further embodiment, the sandwich block comprises at least one edge plate which is aligned perpendicular to the web layers and/or block plate layers of the sandwich block and terminates the sandwich block on one side.

A cover plate or edge plate gives the sandwich block additional stability. In particular by slicing the sandwich block into at least one core layer of a sandwich plate, at least one cover strip can be generated from the cover plate and at least one edge strip of the core layer can be generated from the edge plate, respectively, wherein the cover strip or edge strip gives the core layer additional stability.

According to a further embodiment, the sandwich block comprises at least one web layer, in particular one web layer, each formed from at least one first web, in particular one first web, and at least one second web, in particular one second web, wherein the first and second web each comprise a plurality of tube segments arranged parallel with respect to their longitudinal extension direction, having a segment width extending perpendicular to the segment height and the longitudinal extension direction, wherein adjacent tube segments have a distance perpendicular to the common longitudinal extension direction, and wherein the distance corresponds to one to two times the segment width, in particular to exactly the segment width, and wherein the tube segments of the at least one first web and the tube segment of the at least one second web are arranged in a common plane, wherein the common plane extends parallel to the extension direction of the web bases of the first web and the second web, and wherein each tube segment of the first web comprises at least one adjacent tube segment of the second web. In other words, this means that a common web layer is formed by mutually interlocking tube segments of two webs, which are rotated to each other by 180° in particular with respect to the longitudinal extension direction of the tube segments. Thereby, in particular the walls of one web are mechanically connected to the web base of the other web.

According to a third aspect of the invention, a core layer is provided, in particular for a sandwich plate according to the invention.

The core layer is formed from at least one web according to the first aspect of the invention, wherein the ratio between the base height and the web depth of the web is between 1:1 and 1:20, in particular between 2:3 and 1:10. The tube segments are arranged along their longitudinal extension direction in direction of a layer thickness of the core layer.

In one embodiment of the core layer, the web depth is between 1 mm and 150 mm, in particular between 3 mm and 120 mm, more particularly between 7 mm and 100 mm.

In a further embodiment, the core layer is formed from a plurality of webs, wherein in particular the plurality of webs is arranged parallel to the direction of extension direction of the web base.

In a further embodiment, the webs of the core layer are mechanically connected to each other.

In a further embodiment of the core layer, the core layer is formed by cutting a sandwich block according to the second aspect of the invention, in particular transversely to the longitudinal extension direction of the tube segments.

According to a fourth aspect of the invention, a sandwich plate is provided, in particular for shell or interior construction or as part of a pallet. The sandwich plate comprises at least one plate layer, in particular two plate layers, and at least one core layer, in particular according to the third aspect of the invention, wherein the at least one plate layer is each formed from a plate, wherein the plate layers comprises a connecting face, and wherein the at least one core layer is formed from at least one web, in particular several webs, according to the first aspect of the invention, and wherein the at least one web is each mechanically connected to the connecting face of the plate layer by means of one of the cut faces of its at least one tube segment.

According to one embodiment, the at least one web is each mechanically connected to the adjacent connecting face of the adjacent plate layer by means of one of the cut faces of its at least one tube segment.

The sandwich plate comprises at least one plate layer and at least one core layer, wherein those form a mutually reinforcing composite system. The sandwich plate consists in particular of at least one plate layer and at least one core layer. The (adjacent) connecting face is a surface in contact with the core layer during assembly of the sandwich plate having the length and width of the plate which defines the edges of the connecting face. In particular, the core layer and the plate layer are connected to each other by means of the connecting face by gluing. The plate layer forms the cohesive basis by means of which the resulting tensile and compressive forces can be absorbed under bending loads, and the core layer forms the reinforcement and stiffening, respectively. The core layer is formed by means of at least one web according to the description above, in particular by means of a plurality of webs, in particular each with a plurality of tube segments. In particular, several webs are arranged in parallel, in particular close to each other.

For particularly high strength, in particular webs of a core layer are each offset to each other in the direction of the segment width (w), in particular offset by half of the segment width (w). The webs are particularly easy to produce and, furthermore, are particularly easy to use for placing on the plate layer, because the web base defines the tube segments and holds them together (sufficiently) in a stable way. In addition, the webs can be easily connected to the connecting face of the plate by means of the cut faces of at least one tube segment, which is in particular easy to glue on many materials, in particular bamboo.

In one embodiment, a plate layer is formed from a plurality of plates. In one embodiment, a core layer is formed form from a plurality of webs stacked one above the other in the direction of the segment depth (d).

According to a further embodiment, the sandwich plate comprises at least one plate layer and at least one core layer, wherein the plate layer comprises a plate with a connecting face, and wherein the core layer comprises at least one web according to the first aspect of the invention, and wherein the at least one web is connected to the adjacent connecting face of the adjacent plate layer by means of at least one first cut face of a tube segment.

According to one embodiment of the sandwich plate, the sandwich plate comprises a first plate layer and a second plate layer which delimit at least one core layer, in particular exactly one core layer, on both sides, wherein the first plate layer is connected to the first cut face of a web of the core layer and the second plate layer is connected to the second cut face of a web of the core layer, wherein the two plate layers terminate in particular the sandwich plate on both sides. For example, at least one plate is made of bamboo plywood.

In this embodiment, each core layer is provided with a plate layer on both sides. This increases the strength of the sandwich plate. In the case of a plurality of layers in a respective core layer between two plate layers, the first cut face and the second cut face are not formed on the same web, but point away from each other as in the case of a single layer. In one embodiment, the core layer comprises only a single layer of webs and has an total depth that corresponds to the segment depth (d) and the web depth (D), respectively, plus deviations due to technical reasons, e.g. manufacturing tolerances, thickness of an adhesive or similar. In this embodiment, the cut faces are the first cut faces and the second cut faces of a single web. A respective core layer is delimited by two outer plate layers at the sides, i.e. in the direction of the depth of the plate or segment depth (d), and is closed in particular at the sides, so that the sandwich plate forms flat and closed outer surfaces in the direction of the depth of the plate or segment depth (d). The core layer is therefore not visible looking on the side of the outer plate surface, but is concealed by the plate layers. In addition, the edges of such a sandwich plate, i.e. the plate sides which are aligned perpendicular to the plane of the core layer, are in particular also closed. For this purpose, cover frames, for example, are already glued in during the production of the sandwich plate. Alternatively, veneer strips or plastic strips are glued on at least partly to open edges, in particular for cutting material, and/or, for example by means of milling, a groove is formed and a wooden strip is subsequently glued in.

For example, when using natural materials or due to production-related tolerances in the generation of the (segment) depth of the webs in the core layer between two plate layers, the tolerances are so small that they can be compensated for example by volumes of glue so that curvature of the adjacent plate layer and/or a reduction in mechanical strength is excluded or at least negligibly reduced.

Surprisingly, it was found that such a sandwich plate has such a high strength, in particular flexural rigidity, that conventional, more expensive and/or heavier plates made of aluminium or plastic, for example, can be replaced by this.

According to a further embodiment of the sandwich plate, the sandwich plate comprises alternately a plate layer and a core layer, where in particular the core layer each comprises a single layer of webs, and wherein in particular the webs are arranged rotated with respect to each other in the core layers. The webs in the core layers are arranged in particular alternately rotated by 90°.

In this embodiment, a first plate layer and a core layer alternate in the direction of the segment depth (d), forming a multiple sandwich plate. In the case of such a multiple sandwich plate, the webs are arranged in particular differently aligned along the segment depth (d) with respect to the axis, especially in particular alternately or in a different sequence relative to this axis, each time rotated by 90° to the other. In particular, the plate layer is formed from a single plate and the core layer is formed from a single layer of at least one web. In a different embodiment with a core layer with several layers of webs, the webs in the formed core layer plane are in particular differently aligned. Thereby, the webs in the formed core layer plane are in particular arranged alternately or in a different order relative to the axis along the segment depth, rotated by 90° to each other.

According to a further embodiment, at least one tube segment of the at least one web comprises a flattening at its wall, in particular wherein the cut faces of the tube segment are formed by a secant of a circular section forming the wall.

According to a further embodiment, the at least one web comprises at least two tube segments, wherein each of the at least two tube segments is connected to a first face of the web base.

According to a further embodiment, the at least one first tube segment and a second tube segment comprise, wherein the first tube segment is connected to a first face of the web base, and wherein the second tube segment is connected to a second face of the web base opposite to the first face, in particular wherein the first tube segments and the second tube segments are arranged alternately at the web base along a web width.

According to a further embodiment, the core layer of the sandwich plate comprises at least one cover strip, wherein the cover strip is arranged parallel to the at least one web base of the webs of the core layer and wherein the cover strip terminates the core layer on one side.

According to a further embodiment, the core layer of the sandwich plate comprises at least one edge strip, wherein the edge strip is arranged perpendicular to the at least one web base of the webs of the core layer and wherein the cover strip terminates the core layer on one side. A cover strip and/or edge strip gives the core layer additional stability.

According to a further embodiment, the sandwich plate further comprises at least one foot or at least one skid, wherein the at least one foot or at least one skid is mechanically connected to the sandwich plate, in particular to the at least one plate layer. The sandwich plate is particularly a part of a pallet, e.g. for transporting goods. Such a pallet comprises feet or skids mechanically connected to the sandwich plate for positioning the pallet. By means of skids, the pallet can be preferably transported over the floor, conveyor belts and roller conveyors, in particular by pulling, pushing, rolling or driving. In particular, the at least one skid each comprises at least one block, wherein the at least one skid is mechanically connected to the sandwich plate by means of the at least one block.

According to a further embodiment, the sandwich plate comprises at least one skid which comprises a bottom board and at least one block mechanically connected to the bottom board, wherein the at least one block comprises a first cover plate, a second cover plate and a core layer arranged between the first cover plate and the second cover plate, wherein the core layer comprises at least one first sublayer and at least one second sublayer, each of which is formed from a plurality of tube segments arranged parallel in a row, wherein the tube segments each comprise a wall and two cut ends which delimit the tube segments in the circumferential direction, wherein in particular the tube segments of the first sublayer are mechanically connected to the first cover plate by means of their cut ends, and wherein the tube segments of the second sublayer are mechanically connected to the second cover plate by means of their cut ends. Thereby, the sandwich plate is part of a pallet.

According to a fifth aspect of the invention, a method for the production of a web, in particular according to the first aspect of the invention, is proposed, wherein the method comprises at least the following steps: Providing a base plate comprising a joint face and providing at least one tube segment, in particular a plurality of tube segments, each comprising two cut ends delimiting a wall of the corresponding tube segment in circumferential direction; and arranging the at least one tube segment on the joint face and mechanically connecting at least one of the cut ends each, in particular both cut ends each, of the at least one tube segment to the joint face of the base plate, wherein the base plate forms the web base of the web.

According to one embodiment of the method for producing a web, the at least one tube segment is produced by the following steps: providing at least one tube; splitting the at least one tube, in particular parallel to the longitudinal extension of the tube, into a plurality of segmental bars, wherein the cut ends of the subsequent tube segment are formed at each segmental bar, in particular by means of splitting; forming an intermediate product by arranging and connecting the at least one segmental bar with the cut ends on a joint face of the base plate; slicing the intermediate product transversely to the longitudinal extension of the at least one segmental bar into several slices so that a respective slice forms a web, wherein the base plate forms the web base and each one of the segmental bars forms a tube segment.

According to a further embodiment, the method comprises at least the following steps: providing at least one tube and a base plate, splitting the at least one tube into a plurality of segmental bars each having an longitudinal extension, wherein the segmental bars each comprise a wall curved transversely to the longitudinal extension, wherein the cut ends of the subsequent tube segment are formed at each segmental bar, in particular by means of the splitting, forming an intermediate product by arranging and connecting the at least one segmental bar with the cut ends on a joint face of the base plate, slicing the intermediate product into several slices transversely to the longitudinal extension of the at least one segmental bar so that a respective slice forms a web, wherein the base plate forms the web base and each one of the segmental bars forms a tube segment.

According to a further embodiment of the method, the segmental bars are produced from a tube using a rip saw. It should be noted here that the tube forms in particular a full circle, but may also form a graduated circle extending over more than 180°.

According to a further embodiment of the method, before arranging the segmental bars on the joint face of the base plate, the joint faces are first glued using a glue application machine and then the segmental bars are applied by means of a stacking system. The joint face is a surface defined by the edges (length and width) of the base plate.

According to a further embodiment, a cut-off saw, also known as multirip saw, is used for the production of the web, i.e. the tube segments connected to the web base according to the description above. In particular, no post-processing is necessary to generate a sufficiently small tolerance of the segment depth (d) and web depth (D).

The machines used here are state-of-the-art machines and are already in use at many manufacturing companies for plate material. This means that the webs may be produced without major investments and, in particular, without the development of a special machine, and thus can keep up with the competing plate products in terms of costs right from the start of production.

According to a further embodiment of the method for the production of a web, the tube is produced by pressing wood mass into an appropriately shaped press moulding channel and hardening the wood mass. Thereby, pure wood mass or wood mass with an additional binder may be used.

According to a further embodiment of the method for the production of a web, the at least one tube segment is produced by pressing a wood mass, in particular in a press moulding channel having a tubular segment shaped recess, or by a flat pressing tool having a suitable contour and hardening of the wood mass. Pure wood mass or wood mass with an additional binder may be used.

According to a further embodiment of the method for the production of a web, the tube segment or segmental bar is produced by means of at least the following steps: Providing a board, in particular an HDF plate, producing a plurality of strips by introducing, in particular milling out, a plurality of mitres, wherein in particular the strips are not completely separated from one another by means of the mitres; forming a tube segment or a segmental bar from the strips, wherein the strips are in particular glued together. An incomplete separation of the strips during introducing the mitres has the advantage that a tube may be formed more easily from the connected strips than from separate strips. In addition, the mitres in this embodiment of the method form recesses for the absorption of glue which makes it easier to assemble the tube.

In particular, the formed tube segment or segmental bar comprises an angular cross-section, in particular a U-shaped, trapezoidal-segmental-shaped or octagonal-segmental-shaped cross-section, wherein an edge of the angular cross-section is each formed by a strip. In particular, the formed tube segment or segmental bar comprises a flattening, wherein the flattening is formed by a strip. Using such a method, tube segments or segmental bars may be produced cost-effectively and easily.

According to a sixth aspect of the invention, a method for producing a sandwich block, in particular according to the second aspect of the invention, is provided, wherein at least two web layers, each of which is formed from at least one web according to the first aspect of the invention, are stacked in the direction of the web heights of their webs, wherein the web layers are mechanically connected to each other, and wherein optionally a block plate layer is arranged between two adjacent web layers.

According to one embodiment, the method comprises at least the following steps: Forming a first web layer from at least one first web according to the first aspect of the invention, arranging a second web layer of at least one second web or a block plate layer of a plate on the first web layer, wherein the block plate layer comprises a first plate side; connecting, in particular gluing, the first web layer to the second web layer or connecting, in particular gluing, the first web layer to the block plate layer, wherein the at least one first web of the first web layer is connected by means of its wall, in particular by means of the respective flattening of the respective wall, to a web base of a second web of the adjacent second web layer or to the first plate side of the adjacent block plate layer. In particular, the web layers and block plate layers may be stacked by means of a stacking system and/or connected with each other by means of a glue application machine.

According to one embodiment, a plurality of flattenings is each generated before connecting a second web layer to a first web layer or to a block plate layer with a first web layer on a plurality of walls of the tube segments of the at least one first web of the first web layer.

According to a seventh aspect of the invention, a method for producing a sandwich plate according to the fourth aspect of the invention is provided, wherein the method comprises at least the following steps: providing a sandwich block according to the second aspect of the invention, wherein the web layers of the sandwich block are arranged such that the tube segments of the first webs and of the second webs are arranged parallel to each other with respect to their longitudinal extension direction; generating at least one core layer by slicing the sandwich block, in particular transversely to the longitudinal extension direction of the tube segments, wherein a plurality of cut faces of the tube segments is formed; arranging the core layer on a first connecting face of a first plate layer and connecting the core layer to the first connecting face, wherein the tube segments of the core layer are connected to the connecting face of the first plate layer by means of their first cut faces; and in particular arranging at least one second connecting face of a second plate layer on the core layer and connecting the second connecting face to the core layer by means of the second cut faces of the tube segments of the core layer.

According to one embodiment of the method, the at least one core layer is formed by slicing the sandwich block transversely to the longitudinal extension direction of the tube segments. The slicing of the sandwich block to generate the at least one core layer may be performed for example by means of a cut-off saw. Arranging the core layer with the plate layer may be performed for example as shown above by means of a stacking system and connecting the core layer to the plate layer may be performed as described above by means of a glue application machine.

Using the process described above, a plurality of core layers may be generated fast, easily and cost-effectively by slicing a sandwich block. This eliminates the need for arranging individual webs on a plate to form a core layer, which results in an acceleration and cost reduction of the process.

According to an eighth aspect of the invention, a further method for producing a sandwich plate, in particular according to the fourth aspect of the invention, is provided, wherein the process comprises at least the following steps:

providing a first plate layer, each of which is formed from a plate comprising a connecting face; providing a core layer, in particular according to the third aspect of the invention, from at least one web according to the first aspect of the invention, in particular from several webs, by arranging the at least one web on the connecting face, so that one of the cut faces of the at least one tube segment of the at least one web is each attached to the first connecting face and mechanically connecting the at least one first cut face to the connecting face, wherein in particular the at least one web is provided by slicing a sandwich block according to the second aspect of the invention, wherein at least one of the cut faces is formed by slicing the sandwich block; optionally providing a second plate layer formed from a plate with a second connecting face, arranging the second plate layer on the core layer such that one of the cut faces of the at least one tube segment of the at least one web is each attached to the second connecting face and mechanically connecting the at least one cut face to the second connecting face.

According to one embodiment, the method comprises at least the following steps: Arranging and connecting at least one web according to one embodiment according to the description above, which is produced in particular as described above, with the first cut face of the at least one tube segment on a first connecting face of a first plate; in particular arranging and connecting a second connecting face of a second plate on the opposite second cut face of the at least one, in particular the same, tube segment of the at least one web.

In order to meet the requirements of the market, production times of about one minute per standard plate dimension, for example 2500 mm×1250 mm, must be achieved. The manufacturing process proposed here offers a solution for this for the first time. Thereby, bamboo tubes are split lengthwise into circular segments and glued parallel to each other onto a base plate, such as a bamboo plywood plate. Mechanically, these sandwich plates are extremely strong at low weight. In particular, a very high bending stiffness is achieved by the material of the base plate of the webs, which is significantly higher than the previously proposed sandwich plates with bamboo raw material. It is even possible to achieve mechanical properties that can compete with ecologically and economically disadvantageous aluminium plates or plastic plates.

A glue application machine and a stacking system may also be used for this purpose. This means that the sandwich plates may be produced without major investments and, in particular, without the need to develop a special machine, thus keeping up with competing plate products in terms of costs from the very beginning of production.

According to a further embodiment, each cut face of a particular web of the sandwich plate is connected to an adjacent face, i.e. to at least one connecting face of a plate layer or (in the case of several layers in a single core layer) with at least one cut face, in particular by means of gluing, for example by means of applying glue and subsequent placing.

In particular, a particularly high strength is achieved by using in each case in particular adhesive surfaces, such as cut faces, when bonding the individual elements.

According to one embodiment of the process for producing a sandwich plate, in a further step at least one web is arranged and connected to the first cut face of the at least one tube segment on a third connecting face of the second plate layer to form a further core layer. In particular, at least one fourth connecting face of a third plate layer is further arranged and connected to the opposite second cut face of the at least one tube segment of the at least one web, wherein in particular at least one further plate layer and/or at least one further core layer is formed.

According to a further embodiment of the method, the web is produced according to an embodiment according to the description above, which is in particular produced as described above.

Thereby, a multiple sandwich plate is produced. The individual layers are joined in particular one after the other like the layers of a single sandwich plate and/or several simultaneously produced single sandwich plates are connected to each other.

Figure 2:
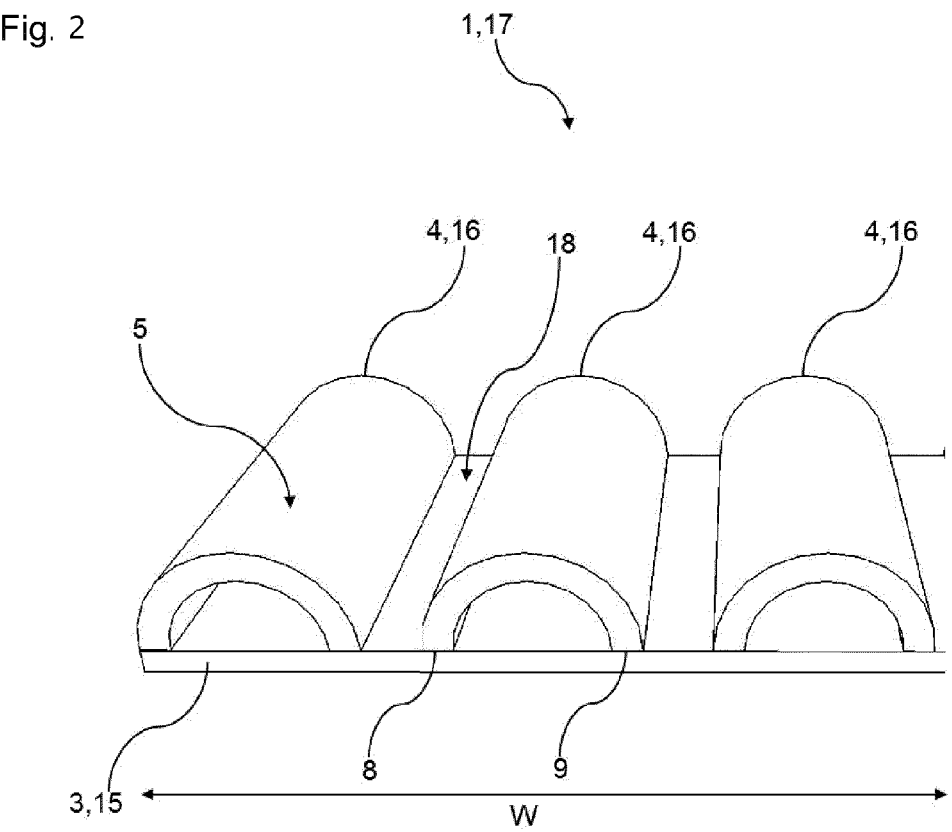
Figure 3:
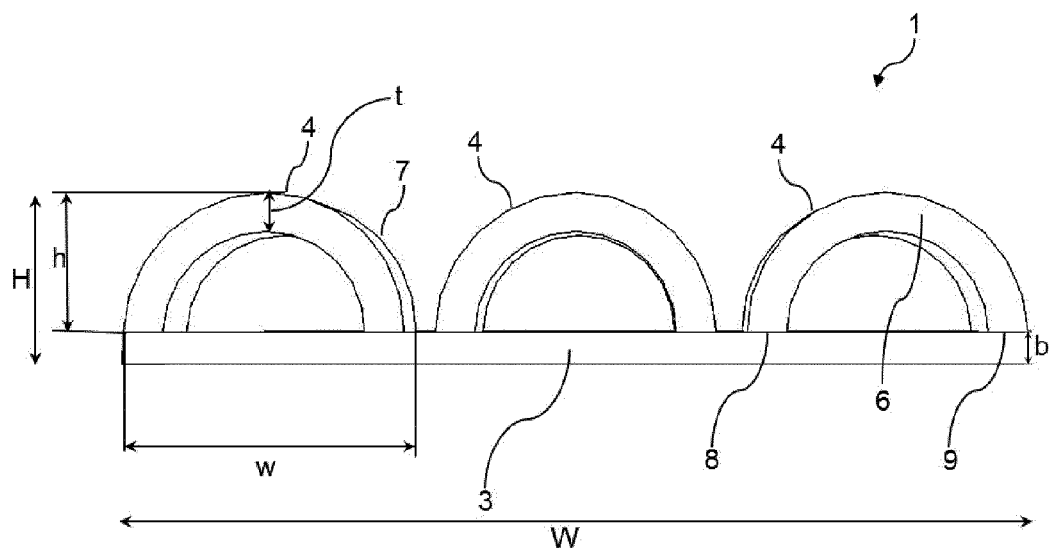
Figure 4:
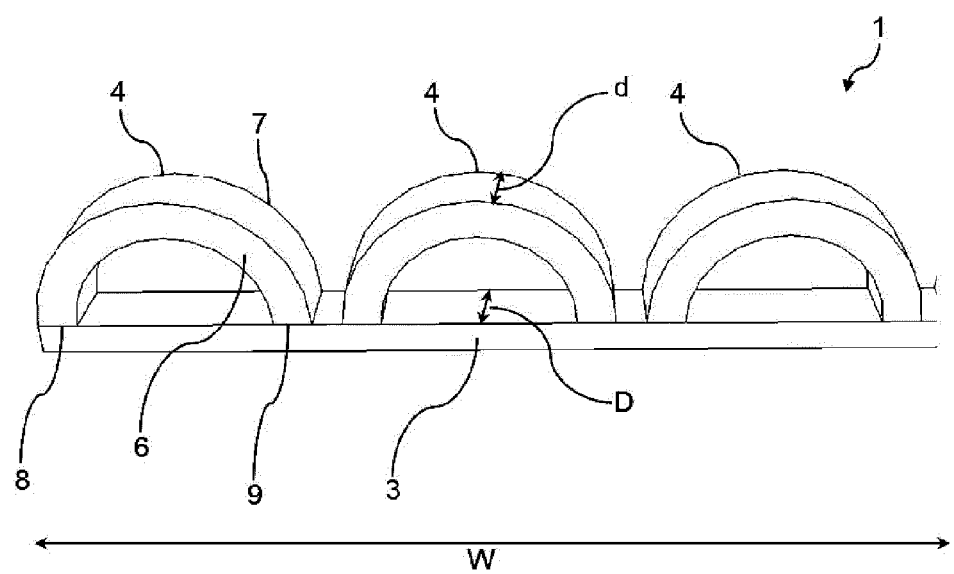
Figure 5:
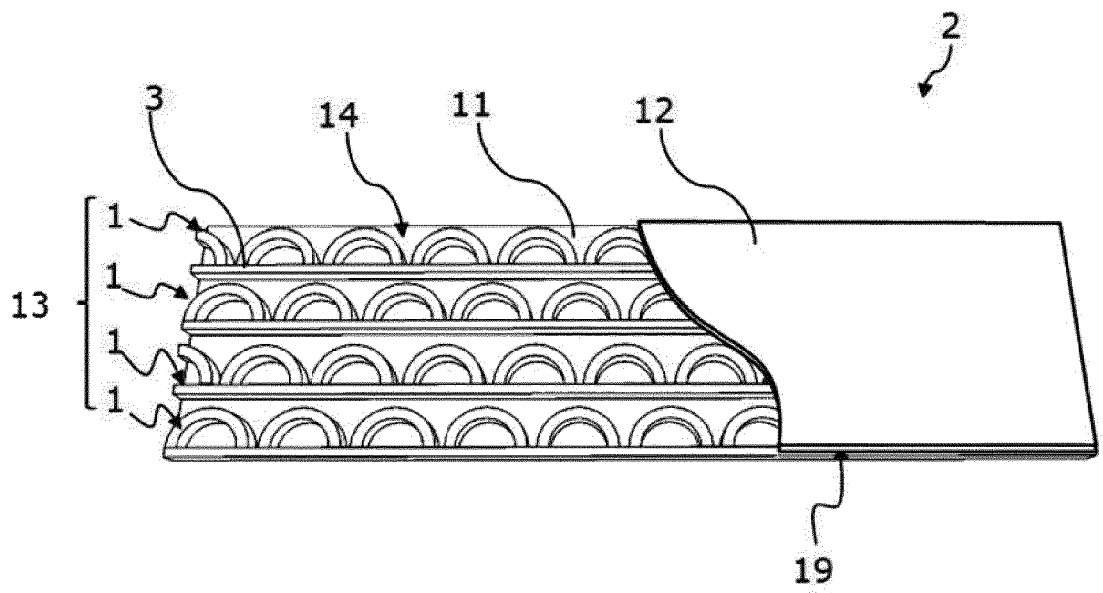
Figure 6:
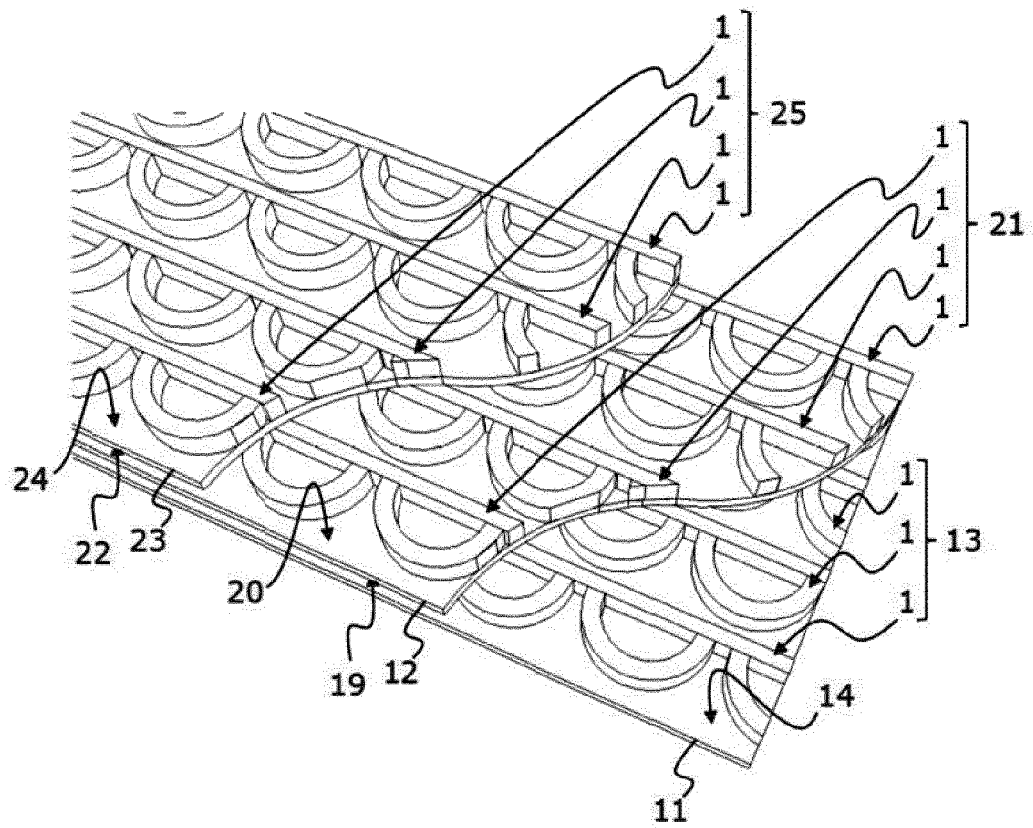
Figure 7:
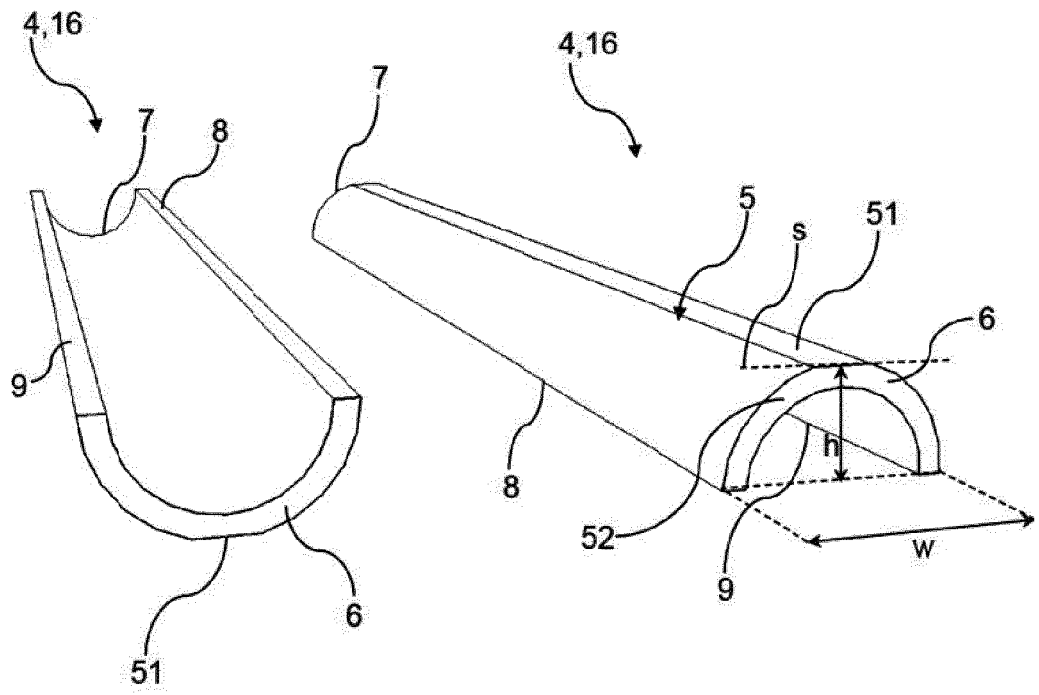
Figure 8:
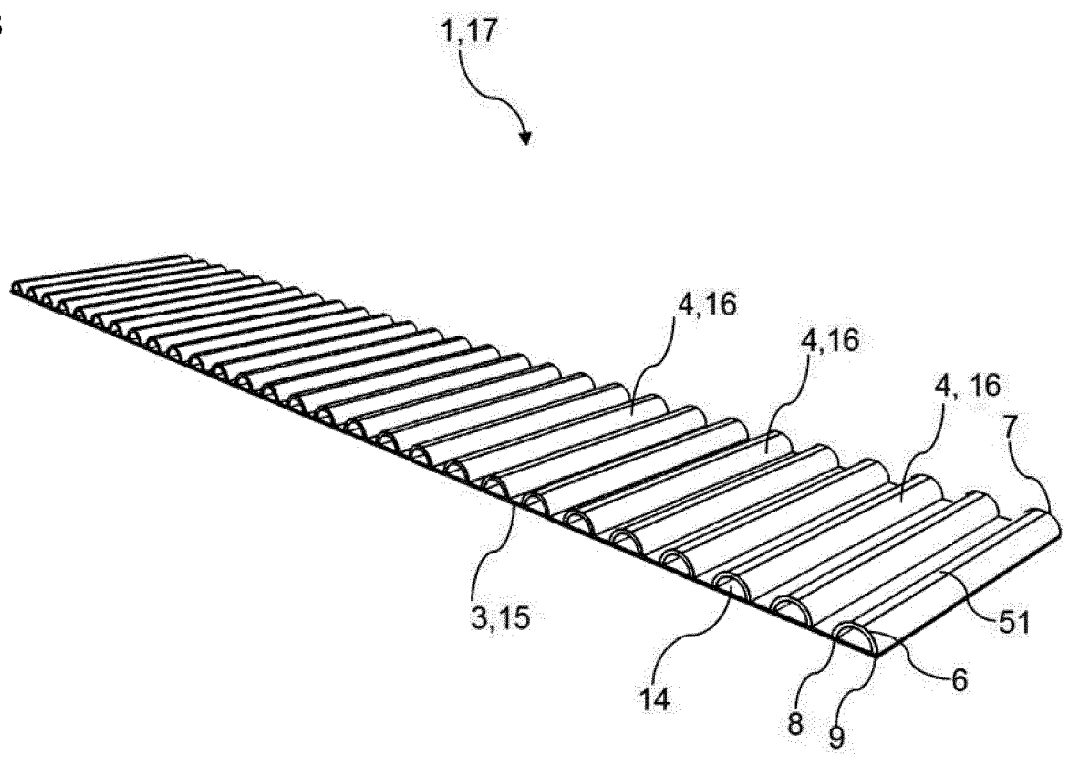
Figure 9:
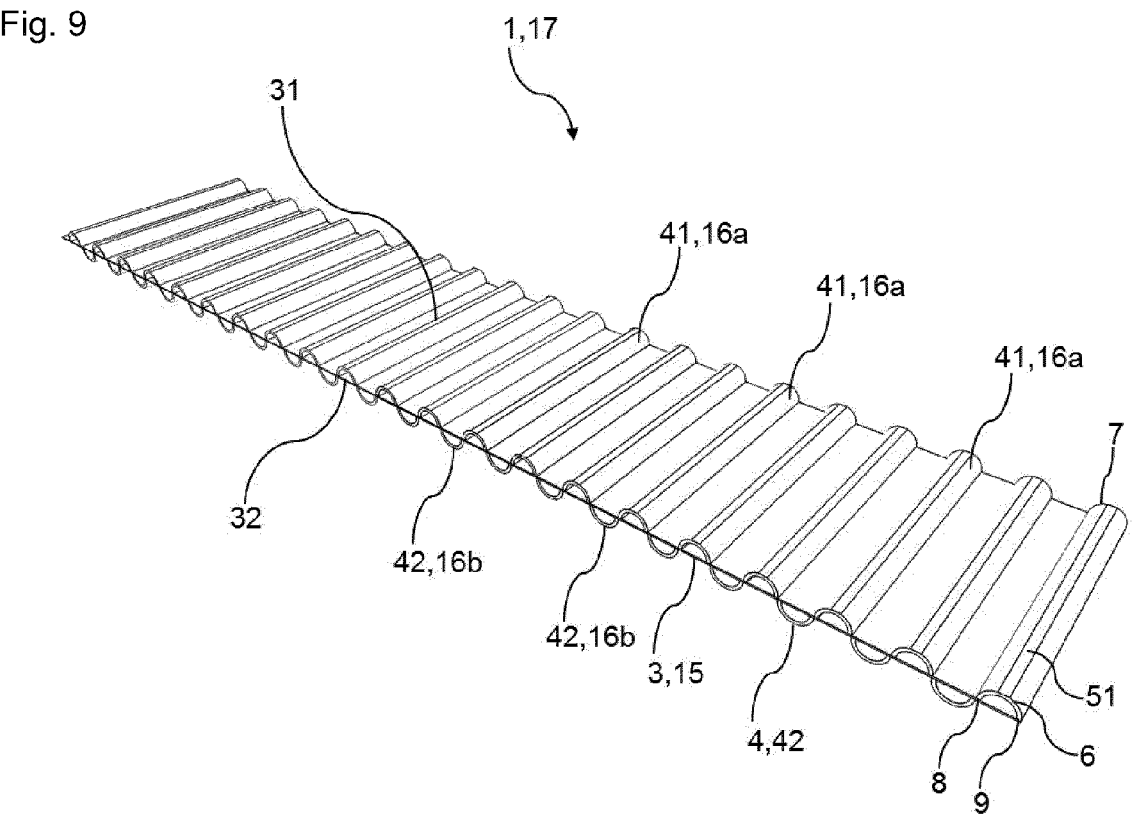
Figure 10:
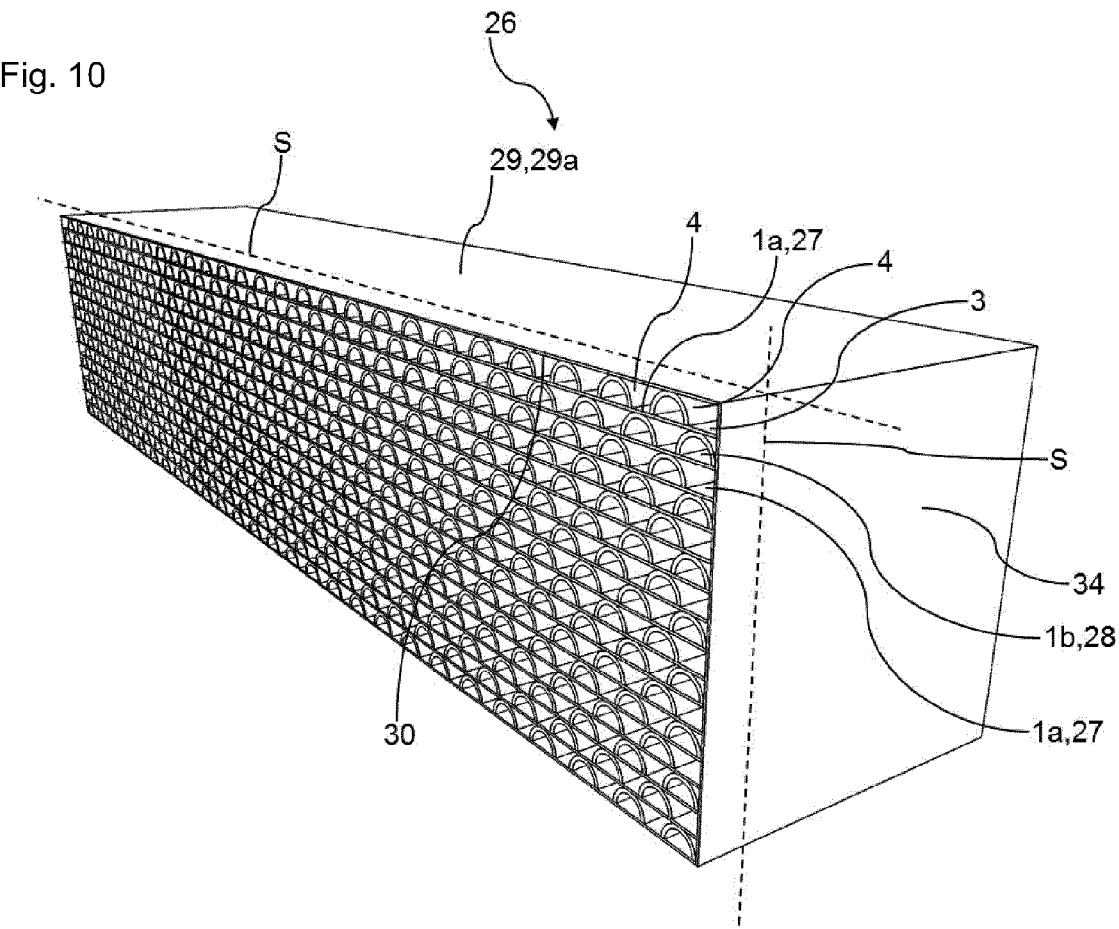
Figure 11:
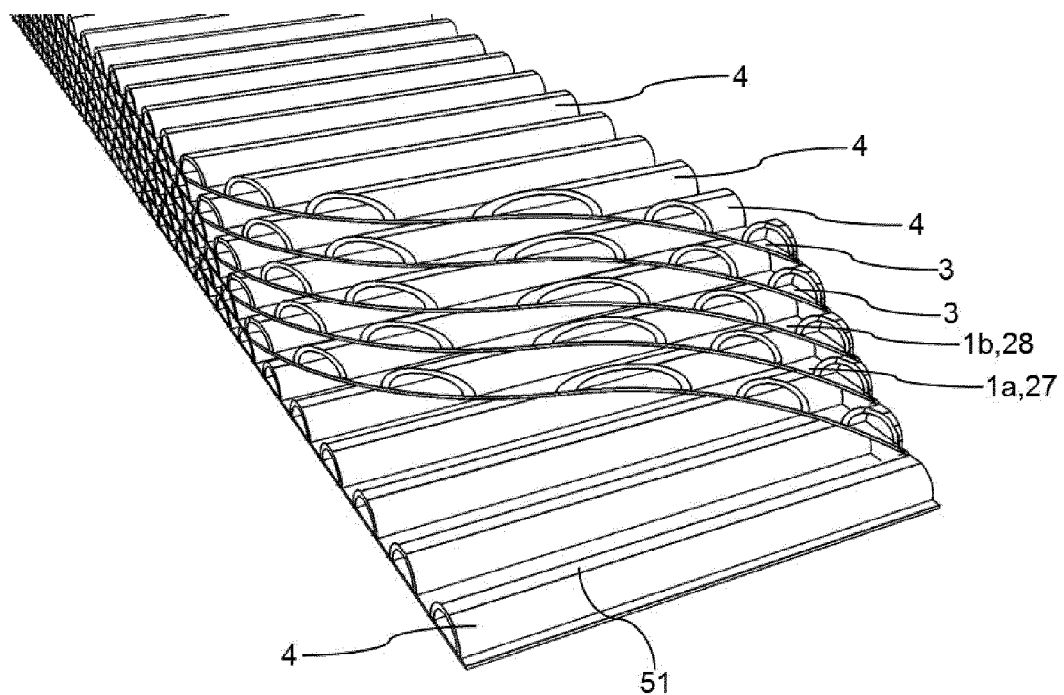
Figure 12:
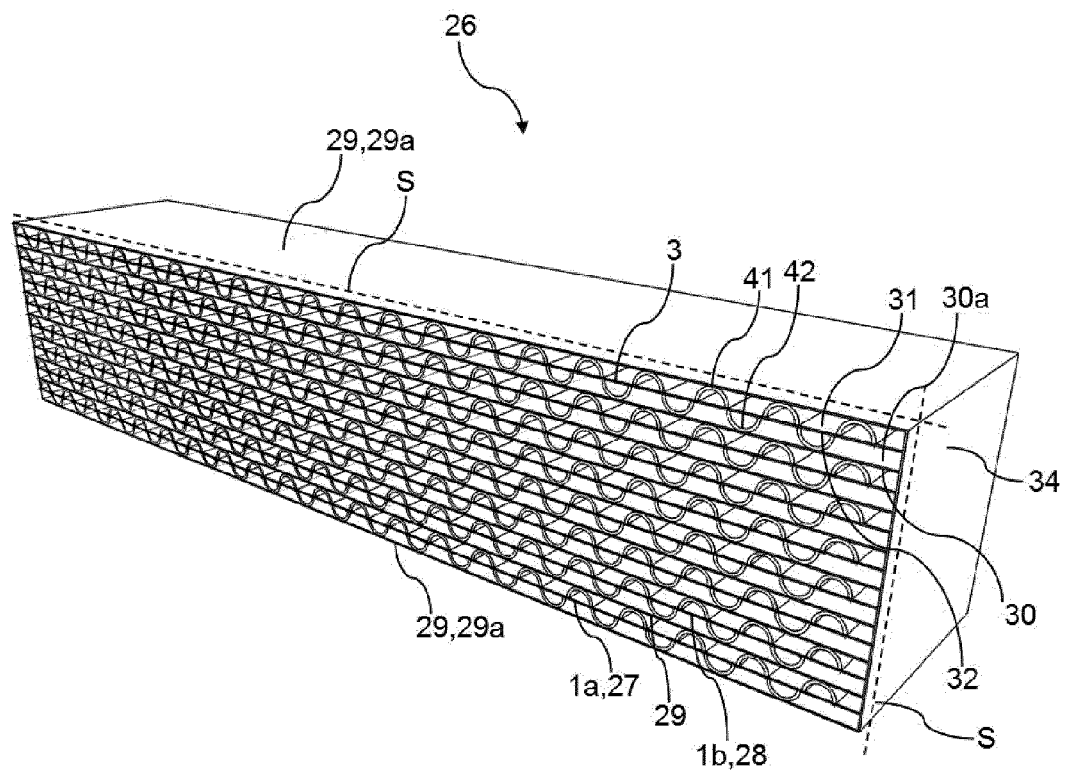
Figure 13:
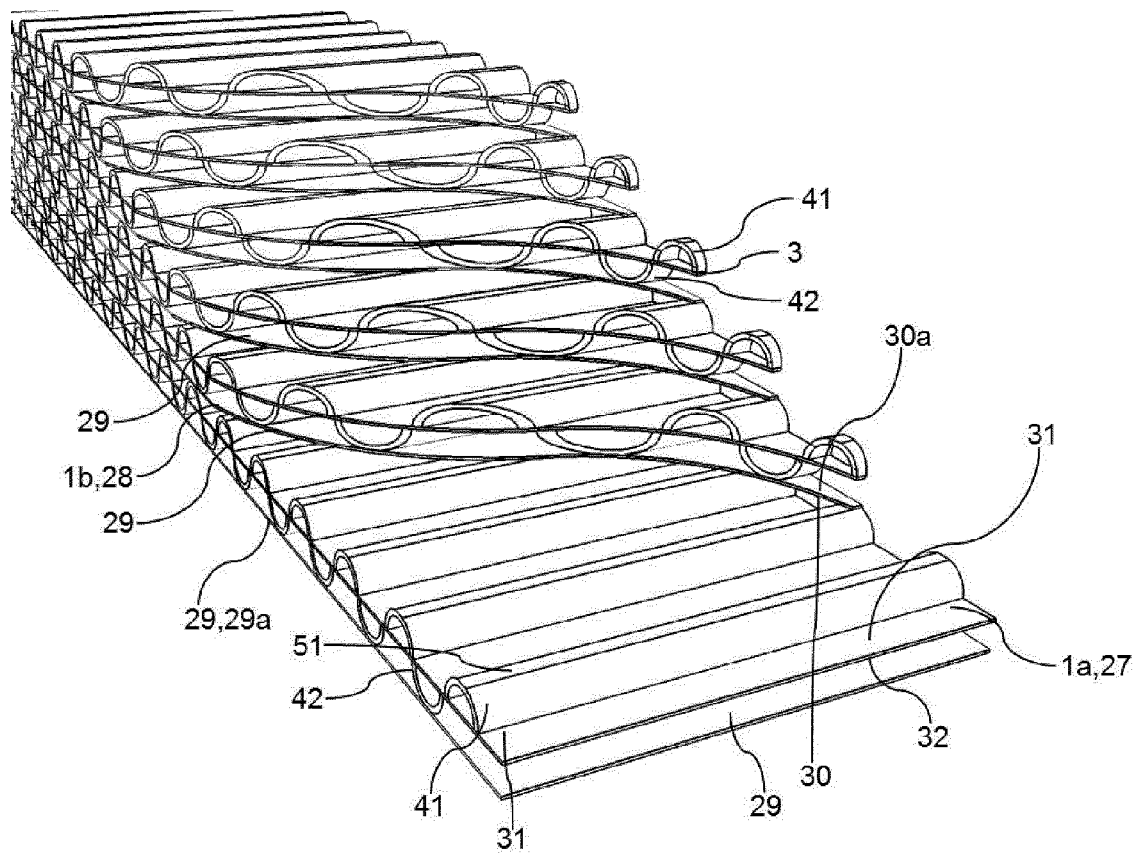
Figure 14:
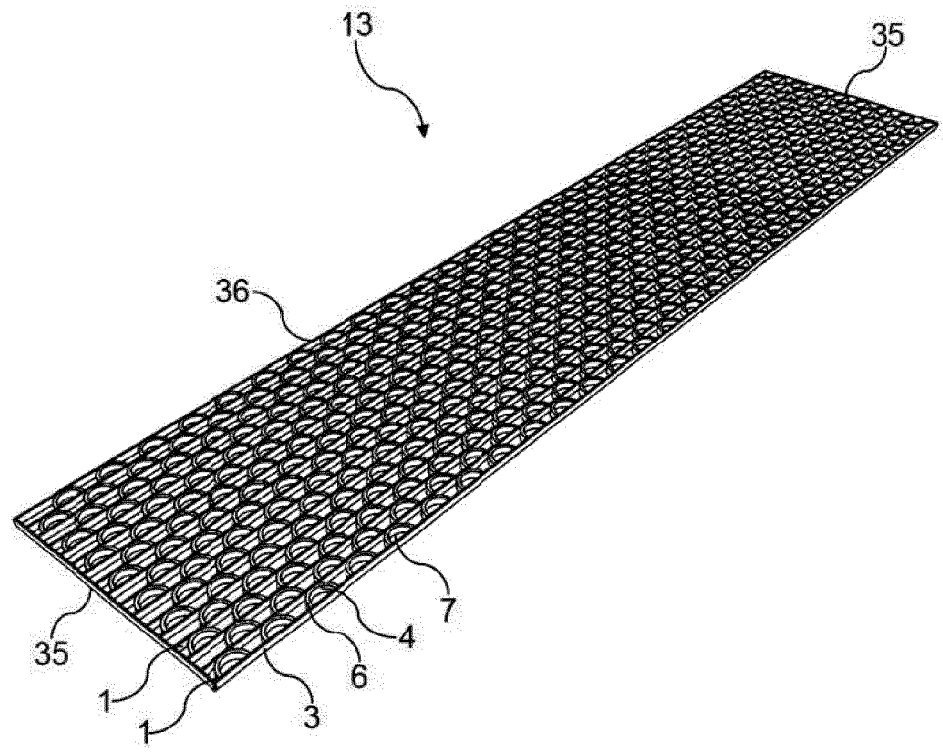
Figure 16:
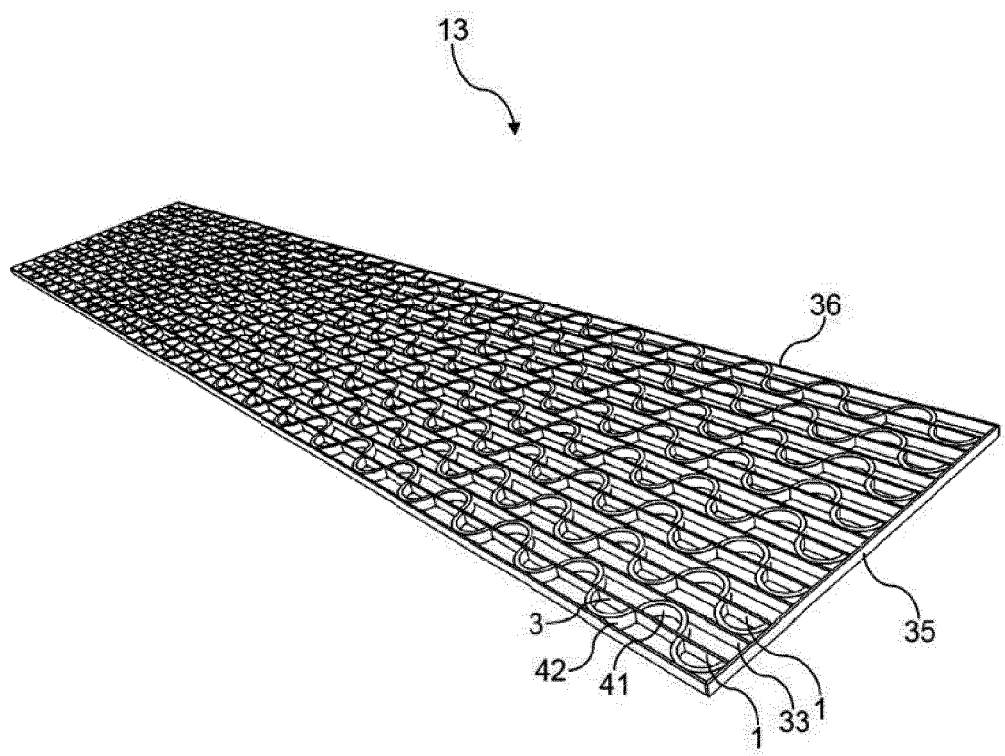
Figure 18:
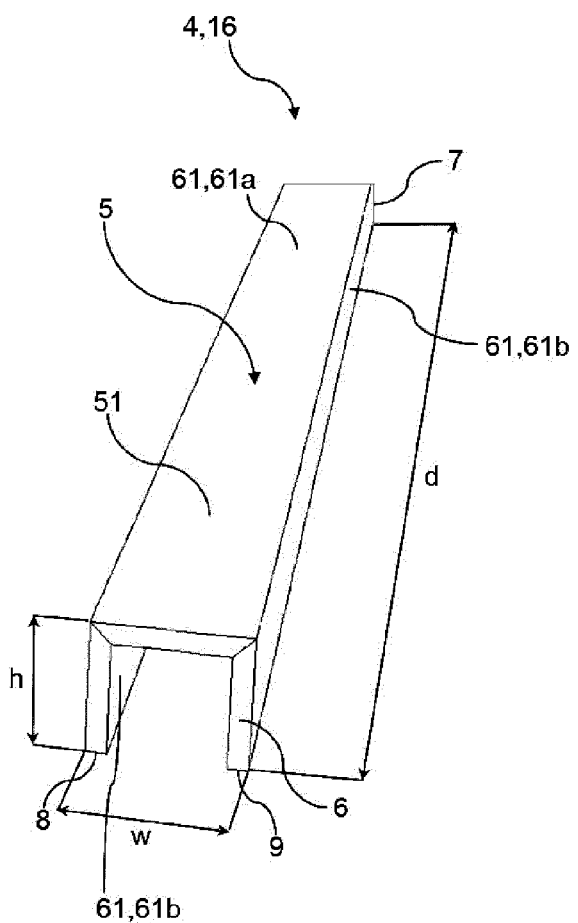
Figure 19:
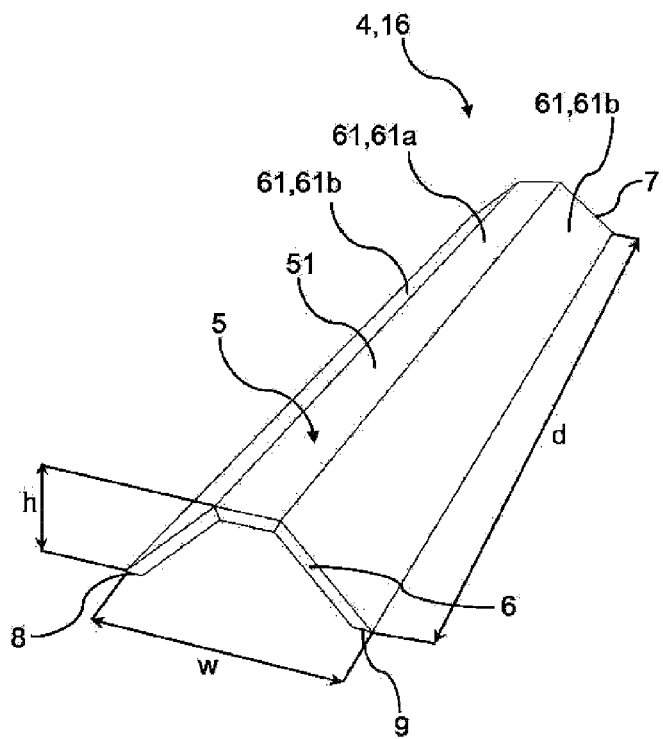
Figure 20:
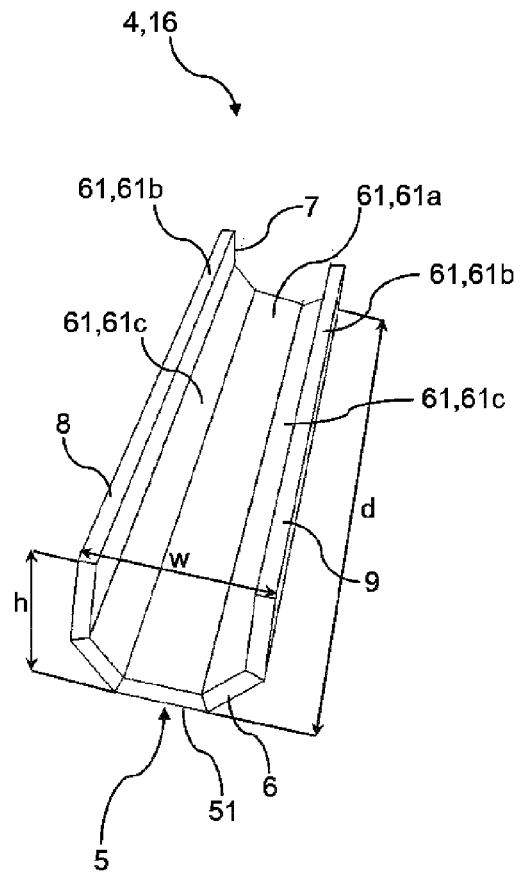
Figure 21:
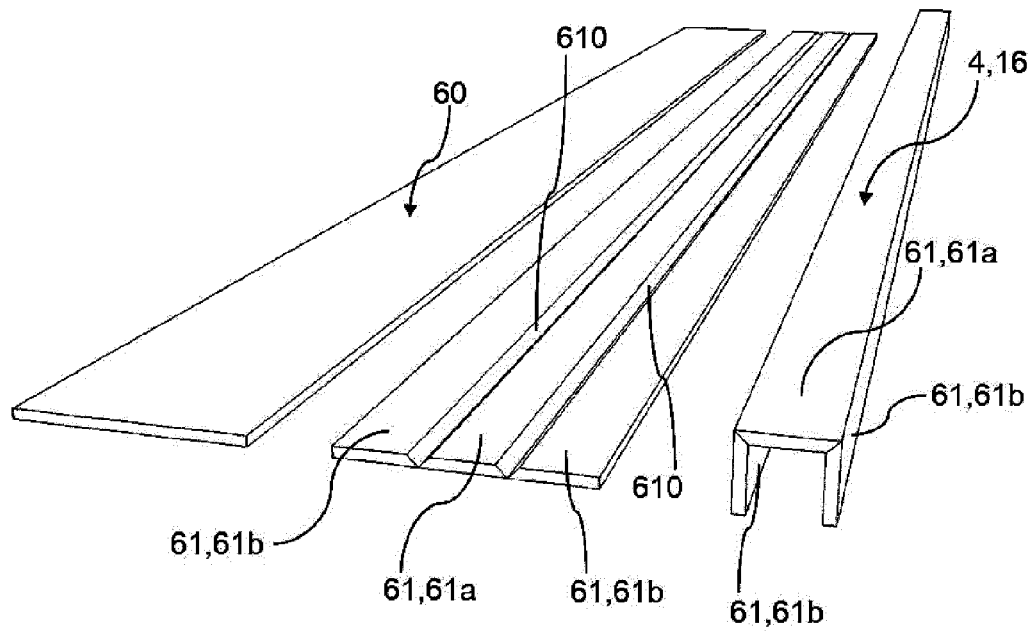
Figure 22:
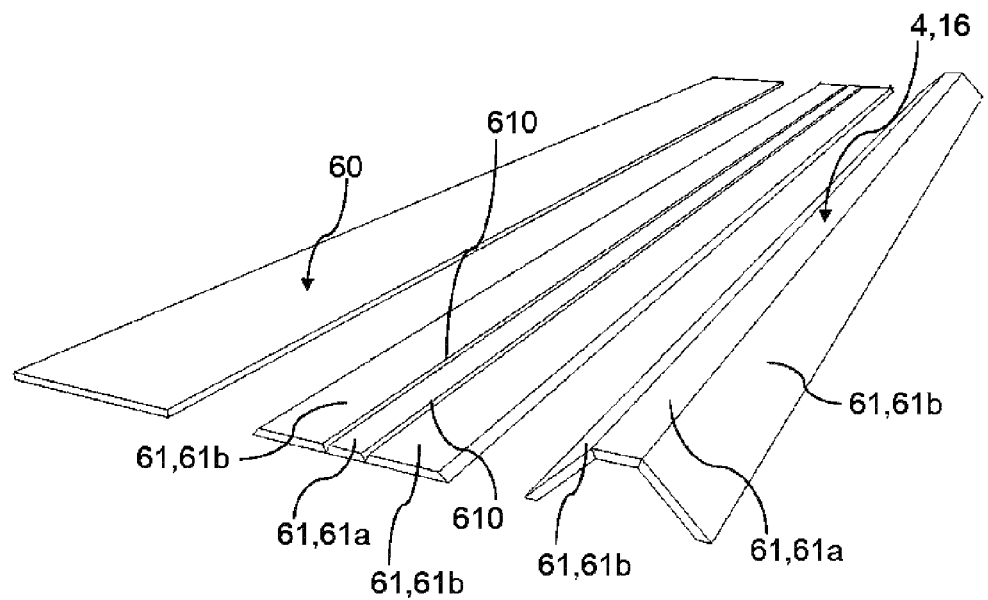
Figure 23:
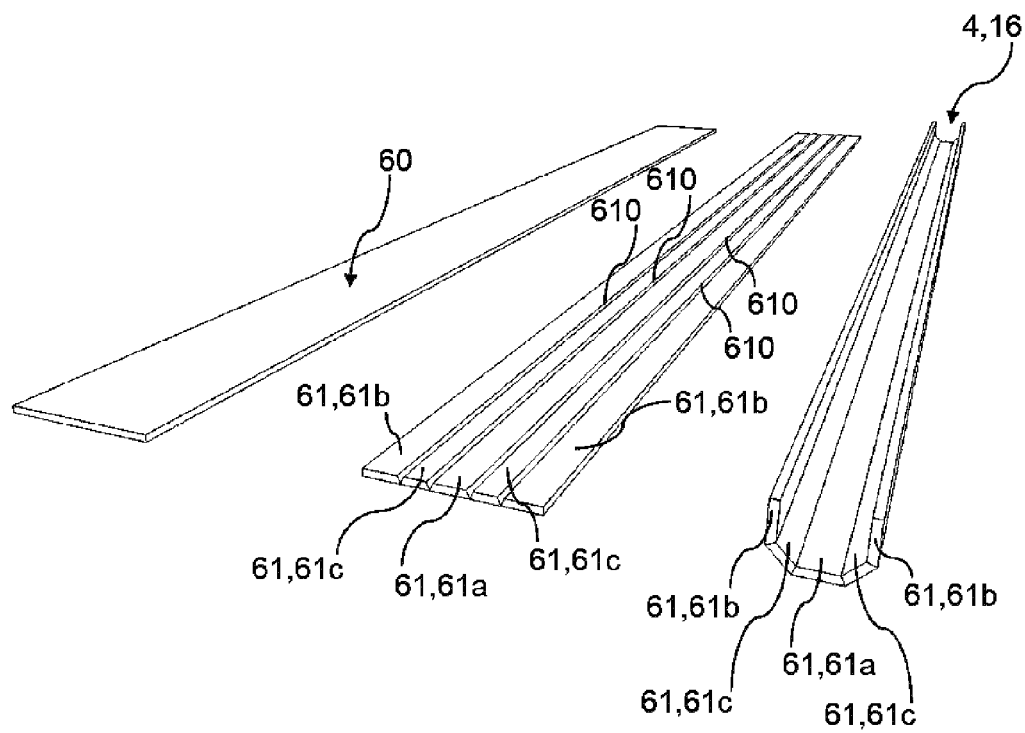
Figure 24:
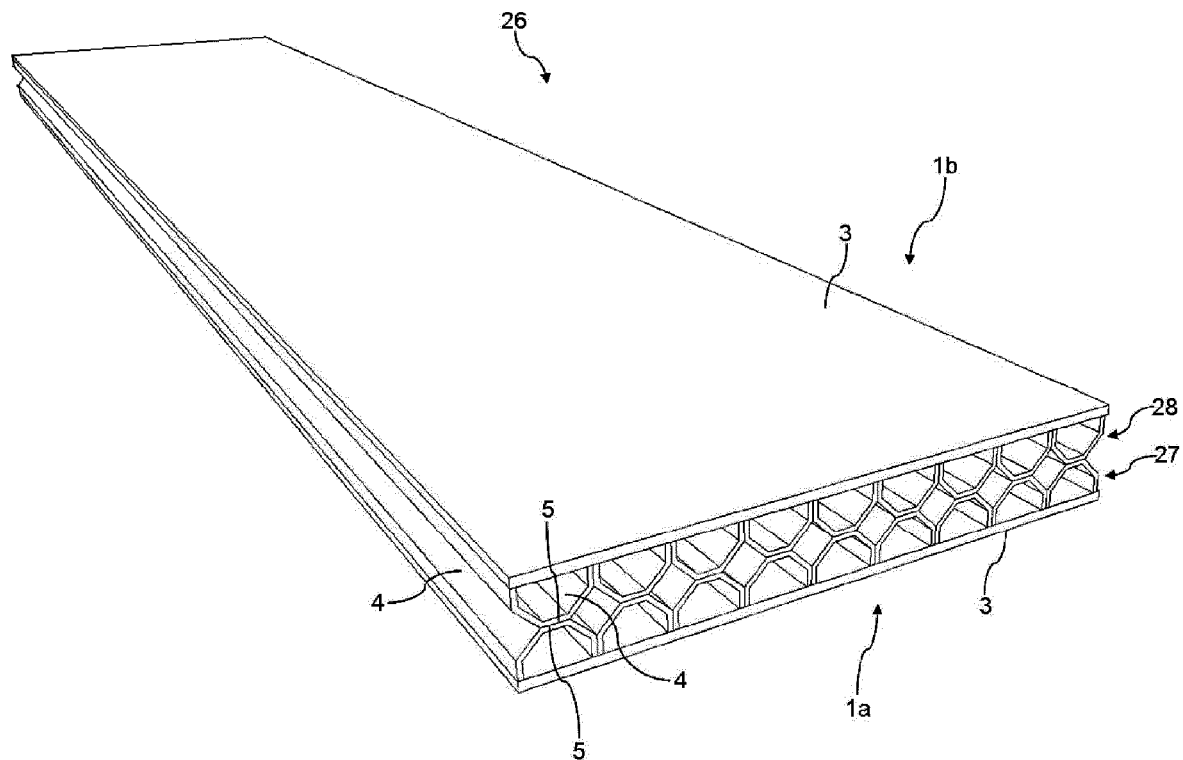
Figure 25:
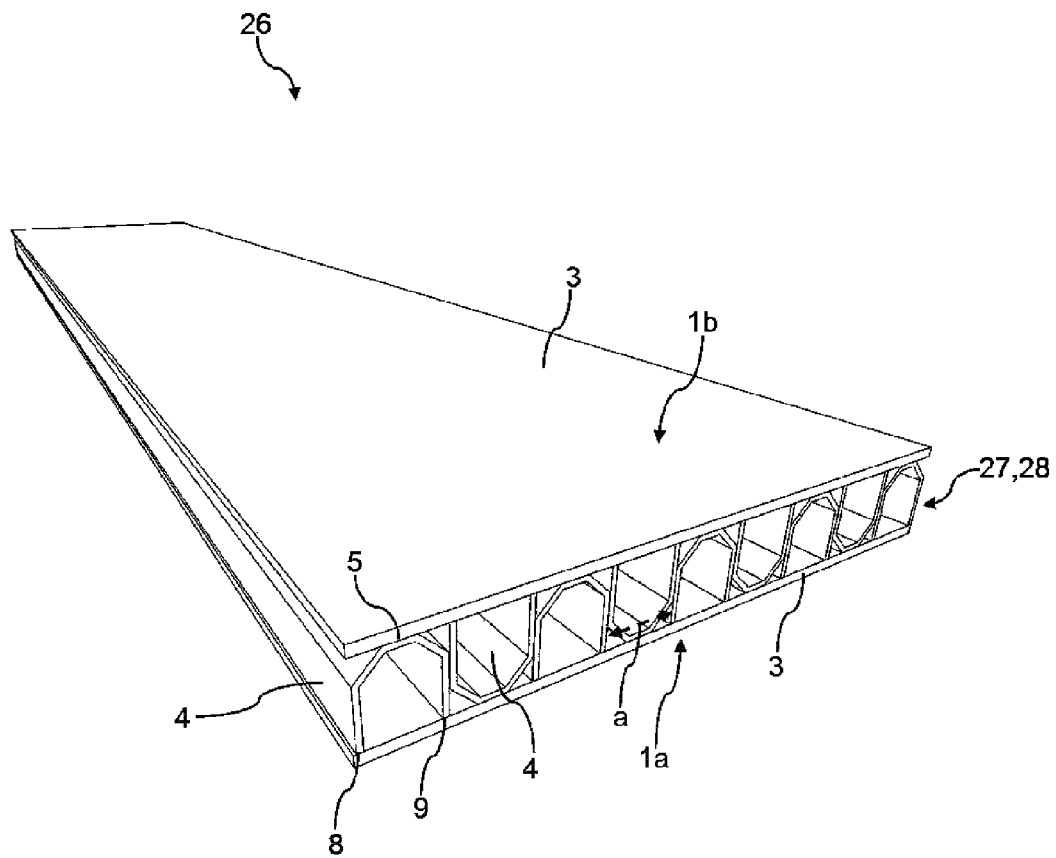

The invention described above is explained in detail in the following against the relevant technical background with reference to the corresponding drawings demonstrating further embodiments. The invention is not restricted in any way by the purely schematic drawings, wherein it is of note that the drawings are not dimensionally accurate and are not suitable for the definition of proportions. It is shown in FIG. 1: a segmental bar or a tube segment;

FIG. 2: a web or an intermediate product in a perspective view;

FIG. 3: a web in top view;

FIG. 4: a web in a perspective view;

FIG. 5: a single sandwich plate;

FIG. 6: a multiple sandwich plate;

FIG. 7: a segmental bar or tube segment having a flattening;

FIG. 8: a first embodiment of a web or intermediate product;

FIG. 9: a second embodiment of a web or intermediate product;

FIG. 10: a perspective view of a first embodiment of a sandwich block;

FIG. 11: a partial section of a sandwich block according to the first embodiment;

FIG. 12: a perspective view of a second embodiment of a sandwich block;

FIG. 13: a partial section of a sandwich block according to the second embodiment;

FIG. 14,15: a core layer of a sandwich plate according to a first embodiment;

FIG. 16,17: a core layer of a sandwich plate according to a second embodiment;

FIG. 18: a segmental bar or a tube segment with a U-shaped profile;

FIG. 19: a segmental bar or a tube segment with a trapezoidal-segmental-shaped profile;

FIG. 20: a segmental bar or a tube segment with an octagonal-segmental-shaped profile;

FIG. 21: a schematic representation of a manufacturing process for a segmental bar or a tube segment with a U-shaped profile;

FIG. 22: a schematic representation of a manufacturing process for a segmental bar or a tube segment with a trapezoidal-segmental-shaped profile;

FIG. 23: a schematic representation of a manufacturing process for a segmental bar or a tube segment with an octagonal-segmental-shaped profile;

FIG. 24: a schematic representation of a sandwich block in a further embodiment having connected walls of the tube segments;

FIG. 25: a schematic representation of a sandwich block having a layer formed from interlocking tube segments of two webs.

FIG. 1 schematically shows a segmental bar 16 or a tube segment 4 which are formed in particular from a tube 10, e.g. from a wood-based material. In particular, the segmental bar 16 is formed from a tube 10 having a bar length L, for example a bamboo tube.

The segmental bar 16 or the tube segment 4 comprises a wall 5 with a semicircular cross-section, wherein the thickness t of the wall 5 is significantly lower than the segment height h. In particular, wall 5 is curved.

The cross-section or wall 5 ends in circumferential direction in a first cut end 8 and a second cut end 9. The circumferential direction is also referred to as wall direction.

The cut ends 8 and 9 are produced in particular directly when splitting a tube. For example, cut ends 8 and 9 are produced directly when splitting a bamboo tube. If, for example, bamboo tube is used, the outside and inside of wall 5 are very smooth and difficult to glue, while the cut ends 8 and 9 bare easily bondable material.

The segment width w is the maximum distance between the cut ends, which is aligned parallel to the cut ends 8 and 9 in this example. With an ideal semicircle, the segment width w thus corresponds to the sum of twice the thickness t of wall 5 and twice the inner radius. The segment height h is the maximum distance between an imaginary connecting line between the, or a contact plane of, cut ends 8 and 9 and the maximum elevation of the outer face of wall 5, i.e. in this example perpendicular to the segment width w and to the segment depth d. In particular, the segment height h is perpendicular to the segment width w and the bar length L. The segment depth d is aligned parallel along the cut ends, in particular parallel to wall 5. The tube segment 4 is delimited in longitudinal extension direction by the cut faces 6, 7.

The bar length L is as long as possible, in particular when bamboo tubes are used, so that as many tube segments 4 as possible (see FIG. 3 and FIG. 4) may be produced from one segmental bar 16. This amount depends mainly on the raw material and/or machine requirements.

In FIG. 2, a section of a web 1 or an intermediate product 17 with a web width W is shown, where several segmental bars 16 of the intermediate product or several tube segments 4 of the web 1 are placed with their cut ends 8, 9 to the joint face 18 of the base plate 15 or the web base 3, wherein in particular glue has been previously applied to the joint face 18. The segmental bars 16 and tube segments 4 are designed in particular as shown in FIG. 1 and have in particular the same dimensions. The distance between the individual segmental bars 16 is to be determined depending on the production and/or mechanical requirements. The base plate 15 is here in particular produced from a single plate. For example, the base plate 15 is made of bamboo plywood.

FIG. 3 shows a web 1 with a web width W and a web height H in top view and FIG. 4 the same web 1 in perspective view. Here, the (front) first cut face 6 can be seen and the (rear) second cut face 7 is hidden, which delimit the longitudinal extension of the tube segment 4 at a distance from the segment depth d and the web depth D to each other. The web comprises a web base 3 with a base height b. In particular, the web is formed by means of a cut-off saw from the intermediate product 17, as shown for example in FIG. 2. Then, the web base 3 is formed from the base plate 15 and the respective tube segment 4 is formed from each one of the segmental bars 16 arranged next to each other. This method is not only cost-effective and allows fast and reliable processing, but also enables the web 1 to have in total the same depth (see FIG. 4) for both the tube segments 4 (segment depth d) and the web base 3 (web depth D). This means that a particularly high mechanical strength of a sandwich plate 2 and/or a particularly even surface may be achieved for two plate layers 11 and 12 (see FIG. 5).

FIG. 5 shows a (single) sandwich plate 2 with a first plate layer 11 and a second plate layer 12, which is shown as section, so that the core layer 13 arranged in between is partially visible. Here, the core layer 13 is solely formed from several webs 1 of the same web depth D. In particular, the webs 1 are at least partially designed as shown in detail in FIG. 3 and FIG. 4 and as described above. In this example, core layer 13 is formed as a single layer. The webs 1 are each connected with their cut faces 6 or 7 to the respective connecting faces 14 (here only indicated by the first plate layer 11). In particular, the webs 1 are placed on a previously glued (first) connecting face 14 of the first plate layer 11 and then placed on the also previously glued (second) connecting face 19 of the second plate layer 12. Here, the plate layers 11 and 12 are formed in particular from a single plate. The plate is made of bamboo plywood, for example.

FIG. 6 shows a (multiple) sandwich plate 2 with a first plate layer 11, a second plate layer 12 and a third plate layer 23, as well as a first core layer 13, a second core layer 21 and a third core layer 25. Here, the core layers 13, 21 and 25 are constructed with webs 1 parallel to each other and are each arranged in the direction of the segment width w (see FIG. 3), each offset by half of the segment width w, and otherwise aligned in the same way. The cut faces 6 and 7 of the webs 1 aligned in opposite directions (see FIG. 3) are each connected, in particular glued, to the adjacent connecting face, i.e. from the first core layer 13 to the first connecting face 14 of the first plate layer 11 and to the second connecting face 19 of the second plate layer 12, from the second core layer 21 to the third connecting face 20 of the second plate layer 12 and to the fourth connecting face 22 of the third plate layer 23, as well as from the third core layer 25 to the fifth connecting face 24 of the third plate layer 23. In particular, a final plate layer (as in FIG. 5 for the single sandwich plate 2) is further arranged and fixed on the third core layer 25. The number of core layers must be designed mechanically in relation to the application and is not limited to exactly three. Furthermore, the alignment of the webs 1 in the core layers has to be designed mechanically or thermally (isolation) depending on the application of the sandwich plate 2. Moreover, several layers of webs are arranged in one case of application in a single, several or all core layers, in particular rotated to each other relative to one axis parallel to the segment depth d (see FIG. 4).

With the invention described here, the price requirements of the market for plate material can be met by short production times and sustainable material may be used at the same time.

FIG. 7 shows a segmental bar 16 or a tube segment 4, that are formed in analogy to the drawing shown in FIG. 1, with an additional flattening 51, which is arranged on wall 5 of segmental bar 16 or tube segment 4. In the example shown here, the flattening 51 is formed by an imaginary secant s of a circular ring segment 52, which forms the cross-section of wall 5, wherein in this example, the cut faces 6, 7 of the tube segment 4 form the cross-section of wall 5. Thereby, the secant s is arranged in such a way that the outer circle, delimiting the circular ring segment 52, is cut at two points by the secant s, but the inner circle, delimiting the circular ring segment 52, is not cut by the secant s. The flattening 51 shown is arranged within the area of the zenith, thus at the highest point of the circular ring segment 52.

The segment height h corresponds in the embodiment shown to the distance between the secant s and the (imaginary) connecting line between the cut ends 8, 9, wherein the secant s and the connecting line run parallel to each other. The flattening 51 shown here runs in the direction of the longitudinal extension of the tube segment 4 and is parallel to the cut ends 8, 9. Thus, tube segment 4 has a uniform segment height h in the area of flattening 51 and (in case of a uniform tube diameter) over the longitudinal extension of the tube segment 4.

This uniform segment height h enables easy connecting the tube segment 4 to a flat structure, e.g. a plate, by means of the flattening 51, wherein a positive connection between the flattening 51 and the flat structure may be achieved without any disadvantageous gaps. In particular, such a flattening 51 makes it possible to easily connect or stack webs 1, which comprise tube segments 4 with flattenings 51, or to connect or stack corresponding webs 1 with plates, e.g.

in the production of sandwich plates or sandwich blocks according to the present invention.

FIG. 8 shows a perspective view of a first embodiment of a web 1 or an intermediate product 17 for the production of a web 1. The web 1 or the intermediate product 17 comprises a plate 3, 15, which is referred to as web base 3 in the case of a web 1, in the case of an intermediate product 17 as base plate 15. The web base 3 or base plate 15 is connected to a connecting face 14 by a plurality of tube segments 4 (in the case of a web 1) or by segmental bars 16 (in the case of an intermediate product 17), wherein the connecting face 14 is connected to the cut ends 8, 9 of the tube segment 4 or segmental bars 16. In the example shown, all shown tube segments 4 or segmental bars 16 are arranged on the same connecting face 14, wherein the opposite face of the web base 3 or base plate 15 is not connected to tube segments 4 or segmental bars 16. Furthermore, the shown tube segments 4 and segmental bars 16 are arranged parallel to each other and at a distance from each other in relation to the direction of their longitudinal extension. The tube segment 4 or segmental bars 16 shown in FIG. 8 each comprise a flattening 51, wherein the flattenings 51 are formed analogously to the flattening 51 shown in FIG. 7. However, other forms of flattenings 51 are also possible. In the arrangement shown in FIG. 8, flattenings 51 may also be missing in some or all tube segments 4 or segmental bars 16.

FIG. 9 shows a second embodiment of a web 1 or an intermediate product 17 for the production of a web 1. The web base 3 or the base plate 15 comprises a first face 31 and a second face 32, wherein a plurality of first tube segments 41 or first segmental bars 16a is connected to the first face 31 and wherein a plurality of second tube segments 42 or second segmental bars 16b is connected to the second face 32. The tube segments 41, 42 or segmental bars 16a, 16b shown are arranged parallel to each other in relation to the direction of their longitudinal extension. Thereby, the first tube segments 41 or first segmental bars 16a are arranged staggered relative to the second tube segments 42 or second segmental bars 16b, so that an undulating arrangement results in the cross-section, i.e. with regard to the cut faces 6, 7. The tube segments 4 and segmental bars 16 shown in FIG. 9 also each comprise a flattening 51, wherein the flattenings 51 are formed in analogy to the flattening 51 shown in FIG. 7. However, other forms of flattenings 51 are also possible. In the arrangement shown in FIG. 9, flattenings 51 may also be missing in some or all tube segments 4 or segmental bars 16.

FIG. 10 shows a perspective view of a first embodiment of a sandwich block 26 and FIG. 11 shows a perspective view of a partial section of such an embodiment of the sandwich block 26.

The sandwich block 26 shown comprises a plurality of web layers 27, 28, each made of a web 1a, 1b, and a block plate layer 29, made of a plate, in particular a wooden plate, wherein the web layers 27, 28 and the block plate layer 29 are arranged in layers and in particular are connected to each other. Thereby, the web bases 3 of webs 1a, 1b of the web layers 27, 28 are arranged parallel to the plate of block plate layer 29 and tube segments 4 are arranged parallel to each other in relation to the direction of their longitudinal extension. The walls 5 of the tube segments 4 of the first webs 1a of the first web layer 27 are connected to the web base 3 of the second webs 1b of the adjacent second web layer 28, in particular by means of the flattenings 51.

The webs 1a, 1b shown in FIGS. 10 and 11 show the embodiment shown in FIG. 8, wherein the webs 1a, 1b of adjacent web layers 27, 28 in the example shown here are arranged staggered relative to each other in such a way that the tube segments 4 of the first webs 1a are arranged above or below a corresponding distance between two tube segments 4 of the adjacent second webs 1b.

From the sandwich block 26 shown above, a plurality of core layers 13, 21, 25 of a sandwich plate 2 may be produced in particular by slicing, cutting or sawing along a cutting direction S perpendicular to the segment depth d of the tube segments 4 of the webs 1a, 1b of the web layers 27, 28.

The sandwich block 26 further comprises a cover plate 29a, which is arranged parallel to the web layers 27, 28 and the block plate layers 29, and an edge plate 34, which is arranged perpendicular to the web layers 27, 28 and the block plate layers 29. Both the cover plate 29a and the edge plate 34 terminate the sandwich block 26 on one side.

FIG. 12 shows a perspective view of a second embodiment of a sandwich block 26 and FIG. 13 shows a perspective view of a partial section of such an embodiment of the sandwich block 26. The sandwich block 26 shown comprises a plurality of web layers 27, 28, each made of a web 1a, 1b, and a plurality of block plate layers 29, each made of a plate, in particular a wooden plate, wherein the web layers 27, 28 and the block plate layers 29 are arranged in layers and in particular are connected to each other. Thereby, the web bases 3 of webs 1a, 1b of web layers 27, 28 are arranged parallel to the plate of the block plate layer 29 and the tube segments 4 are arranged parallel to each other in relation to the direction of their longitudinal extension. The web layers 27, 28 are arranged alternately with the block plate layers 29 in layers in such a way that a first web layer 27 is connected to a first plate side 30 of the block plate layer 29 and said block plate layer 29 is connected to a second web layer 28 by means of a second plate side 30b.

The webs 1a, 1b shown in FIGS. 12 and 13 show the embodiment shown in FIG. 9. Here, the walls 5 of the first tube segments 41 of the first webs 1a of the first web layer 27 are connected to a first plate side 30 of the plate of the adjacent block plate layer 29 and the walls 5 of the second tube segments 42 of the second webs 1b of the second web layer 28 are connected to a second plate side 30a opposite the first plate side 30. In particular, the first tube segments 41 and the second tube segments 42 are connected to the corresponding plate by means of their respective flattenings 51. In the example shown here, the webs 1a, 1b of adjacent web layers 27, 28 are arranged in such a way that each first tube segment 41 of the first web layer 27 is arranged above or below a corresponding second tube segment 42 of the adjacent second web layer 28.

From the sandwich block 26 shown above, a plurality of core layers 13, 21, 25 of a sandwich plate 2 may also be produced in particular by slicing, cutting or sawing along a cutting direction S perpendicular to longitudinal extension direction of the tube segments 41, 42 of webs 1a, 1b of the web layers 27, 28.

The sandwich block 26 further comprises a cover plate 29a, which is arranged parallel to the web layers 27, 28 and the block plate layers 29, and an edge plate 34, which is arranged perpendicular to the web layers 27, 28 and the block plate layers 29. Both the cover plate 29a and the edge plate 34 terminate the sandwich block 26 on one side.

Figure 15:
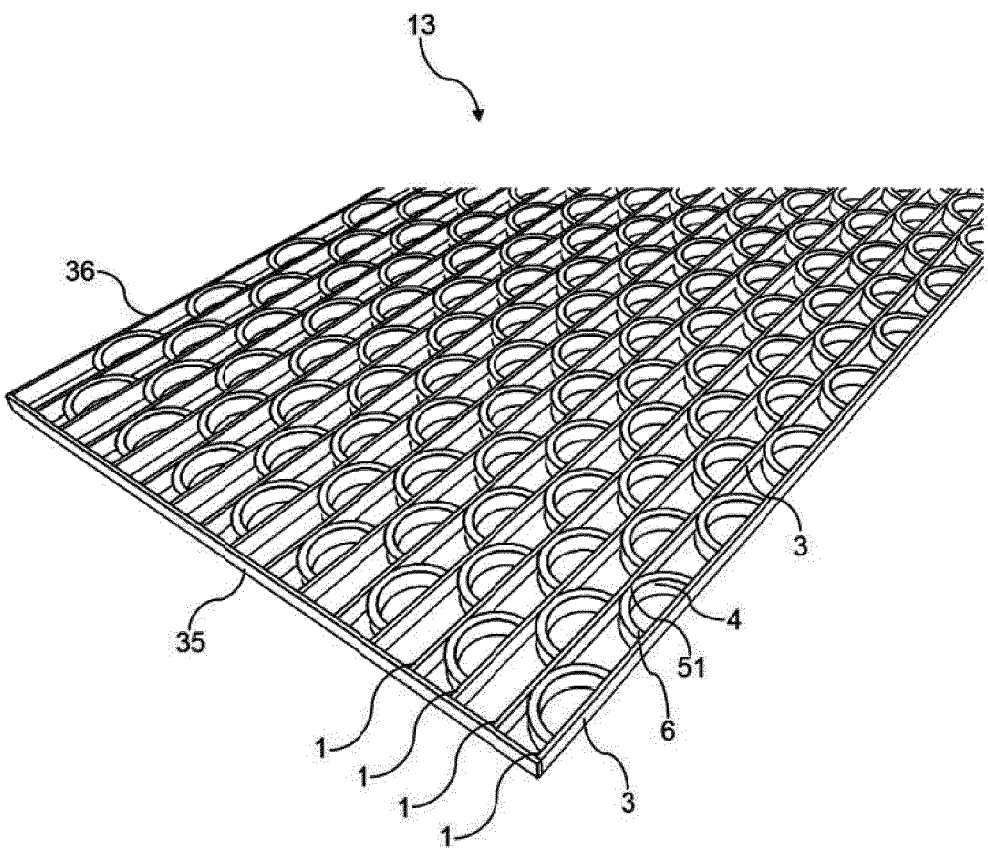

FIG. 14 shows a first embodiment of a core layer 13, 21, 25 of a sandwich plate 2, wherein the sandwich plate may be formed according to FIG. 5 or 6 or analogously to this. FIG. 15 shows a detailed view of a part of a corresponding core layer 13, 21, 25.

The core layer 13, 21, 25 comprises a plurality of webs 1 arranged in such a way that the first cut faces 6 and the second cut faces 7 each form one plane. By means of the cut faces 6, 7 aligned in this way, the core layer 13, 21, 25 can be connected in particular to the at least one plate layer 11, 12, 23. In the embodiment shown, the webs 1 are aligned parallel to each other in relation to their respective web base 3. Thereby, a web 1 is each connected to a web base 3 of an adjacent web 1 by means of the walls 5 of its tube segments 4, in particular by means of the flattening 51 of its walls 5. Furthermore, the core layer 13, 21, 25 comprises two edge strips 35 which are arranged perpendicular to the extension direction of the web bases 3 and which delimit the core layers 13, 21, 25 laterally. Furthermore, the core layer 13, 21, 25 comprises a cover strip 36 which is aligned parallel to the extension direction of the web bases 3 and terminates the core layer 13, 21, 25 on one side. The arrangement of the tube segments 4 in the depicted core layer 13, 21, 25 in the plane of their cut faces 6, 7 corresponds to the arrangement shown in FIG. 8. In particular, such a core layer 13, 21, 25 may be produced by slicing a sandwich block 26 as shown in FIG. 10 parallel to the cutting direction S, wherein the cover strip 36 is formed from the cover plate 29a and wherein the edge strip 35 is formed from the edge plate 34.

Figure 17:
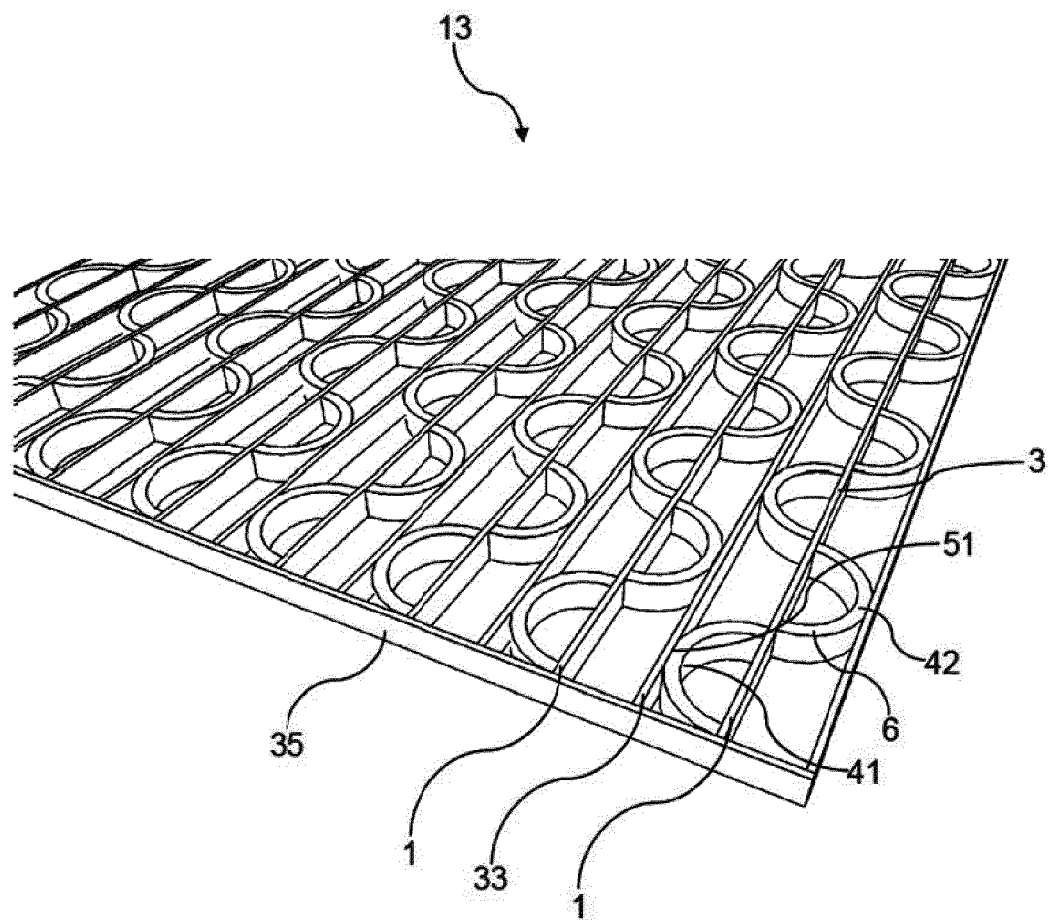

FIG. 16 shows a second embodiment of a core layer 13, 21, 25 of a sandwich plate 2, wherein the sandwich plate may be formed according to FIG. 5 or 6 or analogously to this. FIG. 17 shows a detailed view of a part of a corresponding core layer 13, 21, 25.

The core layer 13, 21, 25 comprises a plurality of webs 1 arranged in such a way that the first cut faces 6 and the second cut faces 7 each form one plane. By means of the cut faces 6, 7 aligned in this way, the core layer 13, 21, 25 can be connected in particular to at least one plate layer 11, 12, 23. In the embodiment shown, the webs 1 are aligned parallel to each other in relation to their respective web base 3. The arrangement of the tube segments 41, 42 shown here in the plane of their cut faces 6, 7 corresponds to the undulating configuration shown in FIG. 9.

Thereby, a web 1 is each connected to an intermediate strip 33 by means of the walls 5 of its first tube segments 41, in particular by means of the flattenings 51 of its walls 5. The corresponding intermediate strip 33 is connected to the second tube segments 42 of an adjacent web 1. Furthermore, the core layer 13, 21, 25 comprises two edge strips 35 which are arranged perpendicular to the extension direction of the web bases 3 and which delimit the core layers 13, 21, 25 laterally. Furthermore, the core layer 13, 21, 25 comprises a cover strip 36 which is aligned parallel to the extension direction of the web bases 3 and terminates the core layer 13, 21, 25 on one side. In particular, such a core layer 13, 21, 25 may be produced by slicing a sandwich block 26 as shown in FIG. 12 parallel to the cutting direction S, wherein the cover strip 36 is formed from cover plate 29a, and wherein the edge strip 35 is formed from the edge plate 34, and wherein the intermediate strips 33 are formed from the plate layers 29.

FIG. 18-20 show tube segments 4 or segmental bars 16 with walls 5, which have an angular cross-sectional profile. Thereby, FIG. 18 shows a tube segment 4 or a segmental bar 16 with a U-shaped wall 5 with two corners. Such a tube segment 4 or such a segmental bar 16 is in particular formed from three interconnected, in particular glued, strips 61, wherein the strips 61 are arranged at an angle of 90° to each other. Thereby, the central strip 61a forms a flattening 51 of wall 5 positioned parallel to the segment width w. Such strips 61 are also shown in FIG. 21 and may be produced from a board 60 as shown in FIG. 21 in particular by milling out correspondingly angled mitres 610. It is of note here that the mitres 610 are not designed to be continuous, so that the strips 61 are not completely separated from each other when generating the mitres 610, but are held together by a connecting layer at the respective mitre. This makes it easier to assemble the tube segment 4. In addition, the mitres thus form recesses for the absorption of glue, which also makes it easier to join the strips 61 together.

Alternatively, such a tube segment 4 or segmental bar 16 may be produced by slicing, in particular sawing, a tube with a square cross-section.

FIG. 19 shows a tube segment 4 or a segmental bar 16 with an in cross-section trapezoidal-segmental-shaped wall 5 with two corners. Such a tube segment 4 or such a segmental bar 16 is formed in particular from three interconnected, in particular glued, strips 61, wherein the strips 61 are arranged at an obtuse angle to each other. In the arrangement shown, the central strip 61a has a smaller width than the two angled outer strips 61b. The central strip 61a is also arranged here parallel to the segment width w and forms a flattening 51. Such strips 61 are also shown in FIG. 22 and may be produced from a board 60 as shown in FIG. 22 in particular by milling out correspondingly angled mitres 610.

FIG. 20 shows a tube segment 4 or a segmental bar 16 with an in cross-section octagonal-segmental-shaped wall 5 with four corners. Such a tube segment 4 or such a segmental bar 16 is formed in particular from five interconnected, in particular glued, strips 61, wherein the strips 61 each have an angle of 45° to each other. Thereby, the outer strips 61b, which form the cut ends 8, 9, are arranged at an angle of 90° to the segment width w, and a central strip 61a, which is connected to the outer strips 61b by two connecting strips 61c, is arranged parallel to the segment width w. This central strip 61a forms a flattening 51 of the wall 5. Such strips 61 are also shown in FIG. 23 and may be produced in particular by milling out correspondingly angled mitres 610 from a board 60 as shown in FIG. 23.

FIG. 24 shows a perspective view of a sandwich block 26 in another embodiment. The sandwich block 26 comprises a first web 1a and a second web 1b mechanically connected to the first web 1a, wherein the first web 1a forms a first web layer 27 and the second web 1b forms a second web layer 28. Thereby, the webs 1a, 1b are aligned antiparallel, i.e. the second web 1b is rotated 180° with respect to the first web 1a around the longitudinal extension direction or segment depth d of the tube segments 4 of the webs 1a, 1b. Thereby, the tube segments 4 of the first web 1a are mechanically connected to the walls 5 of the corresponding tube segments 4 of the second web 1b by means of their walls 5. In the embodiment shown, the tube segments 4 have an octagonal-segmental-shaped cross-section. However, the shown arrangement of the sandwich block 26 is not limited to this cross-sectional shape.

FIG. 25 shows a perspective view of a sandwich block 26 in another embodiment. The sandwich block comprises a first web 1a and a second web 1b, wherein the first web 1a and the second web 1b form a common web layer 27, 28 arranged between the web bases 3. The webs 1a, 1b are aligned antiparallel, i.e. the second web 1b is rotated 180° with respect to the first web 1a around the longitudinal extension direction or segment depth d of the tube segments 4 of the webs 1a, 1b.

Thereby, the web base 3 of the first web 1a forms the lower end of the sandwich block 26. The web base 3 of the second web 1b forms the upper end of the sandwich block 26. The tube segments 4, which are connected to the lower web base 3 by means of their cut ends 8, 9, are assigned to the first web 1a and the tube segments 4, which are connected to the upper web base 3 by means of their cut ends 8, 9, are assigned to the second web 1b. Thereby, the tube segments 4 of the first and second web 1a, 1b are arranged alternately within the layer 27, 28.

The tube segments 4 of the first web 1a and the second web 1b each have a distance a in the direction of the segment width w, which corresponds to a segment width w in the embodiment shown, but may alternatively also be larger than a segment width w. Due to the distance a, the first web 1a and the second web 1b each have gaps in which the tube segments 4 of the respective other web 1b, 1a are arranged. The walls 5 of the first web 1a are connected to the web base 3 of the second web 1b and the walls 5 of the second web 1b are mechanically connected to the web base 3 of the first web 1a. In the embodiment shown, the tube segments 4 have an octagonal-segmental-shaped cross-section. However, the shown arrangement of the sandwich block 26 is not limited to this cross-sectional shape.

LIST OF REFERENCE MARKS 1 web
1a first web
1b second web
2 sandwich plate
3 web base
4 tube segment
5 wall
6 first cut face
7 second cut face
8 first cut end
9 second cut end
10 tube
11 first plate layer
12 second plate layer
13 first core layer
14 connecting face
15 base plate
16 segmental bar
16a first segmental bar
16b second segmental bar
17 intermediate product
18 joint face
19 second connecting face
20 third connecting face
21 second core layer
22 fourth connecting face
23 third plate layer
24 fifth connecting face
25 third core layer
26 sandwich block
27 first web layer
28 second web layer
29 block plate layer
29a cover plate
30 first plate side
30a second plate side
31 first face
32 second face
33 strip
34 edge plate
35 edge strip
36 cover strip
41 first tube segment
42 second tube segment
51 flattening
52 circular ring segment
60 board
61 strip
61a middle strip
61b outer strip
61c connecting strip
610 mitre
h segment height
b base height
H web height
w segment width
d segment depth
D web depth
W web width
t thickness of the wall
s secant
S cutting direction
L bar length
a distance

The invention claimed is:

1. A sandwich plate (2), for shell construction or interior construction, wherein the sandwich plate (2) comprises at least one plate layer (11), and at least one core layer (13), wherein the at least one plate layer (11) is each formed from a plate which comprises a connecting face (14),
characterized in that
the at least one core layer (13) is each formed from at least one web (1) comprising at least the following components:
(i) a web base (3)
(ii) at least one tube segment (4) comprising a wood-based material, and each of the at least one tube segment (4) comprising a respective wall (5) which is delimited in the circumferential direction of the respective tube segment (4) by at least two cut ends (8, 9), wherein the respective wall (5) is delimited in the longitudinal extension direction of the respective tube segment (4) by two cut faces (6, 7), and wherein the at least one tube segment (4) each has a segment height (h) which represents the maximum extension of the respective tube segment (4) perpendicular to the web base (3), and wherein the at least one tube segment (4) has a segment depth (d) extending in the longitudinal extension direction,
wherein the web (1) has a web depth (D) extending in the longitudinal extension direction of the at least one tube segment (4),
characterized in that the at least one tube segment (4) is each mechanically connected to the web base (3) by means of the at least two cut ends (8, 9), wherein the web depth (D) is equal to the segment depth (d) of the at least one tube segment (4),
wherein the at least one web (1) is each mechanically connected to the connecting face (14) of the at least one plate layer (11) by means of one of the cut faces (6, 7) of its at least one tube segment (4),
wherein the wood-based material comprises a lignin content of >5%, by weight,
wherein the web comprises a plurality of tube segments, wherein the tube segments are arranged in parallel relative to their longitudinal extension direction, such that the plurality of separate tube segments comprise respective walls which do not contact each other,
wherein the web (1) comprises at least two tube segments (4), wherein the at least two cut ends (8, 9) of the at least two tube segments (4) are mechanically connected to a first face (31) of the web base (3); or the web (1) comprises at least one first tube segment (41) and at least one second tube segment (42), wherein the at least two cut ends (8, 9) of the at least one first tube segment (41) are connected to a first face (31) of the web base (3), and wherein the at least two cut ends (8, 9) of the at least one second tube segment (42) are connected to a second face (32) of the web base (3) opposite the first face (31), wherein in particular along a web width (W) the first tube segments (41) and the second tube segments (42) are arranged alternately along the web base (3).

2. The sandwich plate (2) according to claim 1, characterized in that the sandwich plate (2) further comprises at least one foot or at least one skid, wherein the at least one foot or at least one skid is mechanically connected to the sandwich plate (2).

3. A sandwich plate (2), for shell construction or interior construction, wherein the sandwich plate (2) comprises at least one plate layer (11), and at least one core layer (13), wherein the at least one plate layer (11) is each formed from a plate which comprises a connecting face (14), characterized in that the at least one core layer (13) is each formed from at least one web (1) comprising at least the following components:
(i) a web base (3)
(ii) at least one tube segment (4) comprising a wood-based material, and each of the at least one tube segment (4) comprising a respective wall (5) which is delimited in the circumferential direction of the respective tube segment (4) by at least two cut ends (8, 9), wherein the respective wall (5) is delimited in the longitudinal extension direction of the respective tube segment (4) by two cut faces (6, 7), and wherein the at least one tube segment (4) each has a segment height (h) which represents the maximum extension of the respective tube segment (4) perpendicular to the web base (3), and wherein the at least one tube segment (4) has a segment depth (d) extending in the longitudinal extension direction, wherein the web (1) has a web depth (D) extending in the longitudinal extension direction of the at least one tube segment (4), characterized in that the at least one tube segment (4) is each mechanically connected to the web base (3) by means of the at least two cut ends (8, 9), wherein the web depth (D) is equal to the segment depth (d) of the at least one tube segment (4), wherein the at least one web (1) is each mechanically connected to the connecting face (14) of the at least one plate layer (11) by means of one of the cut faces (6, 7) of its at least one tube segment (4), wherein the wood-based material comprises a lignin content of >5%, by weight, wherein the web comprises a plurality of separate tube segments, wherein the separate tube segments are arranged in parallel relative to their longitudinal extension direction such that the plurality of separate tube segments comprise respective walls which do not contact each other, wherein the web (1) comprises at least two tube segments (4), wherein the at least two cut ends (8, 9) of the at least two tube segments (4) are mechanically connected to a first face (31) of the web base (3); or the web (1) comprises at least one first tube segment (41) and at least one second tube segment (42), wherein the at least two cut ends (8, 9) of the at least one first tube segment (41) are connected to a first face (31) of the web base (3), and wherein the at least two cut ends (8, 9) of the at least one second tube segment (42) are connected to a second face (32) of the web base (3) opposite the first face (31), wherein in particular along a web width (W) the first tube segments (41) and the second tube segments (42) are arranged alternately along the web base (3).

4. The sandwich plate (2) according to claim 3, characterized in that the sandwich plate (2) further comprises at least one foot or at least one skid, wherein the at least one foot or at least one skid is mechanically connected to the sandwich plate (2).

\* \* \* \* \*